(12) United States Patent
Nakazato

(10) Patent No.: US 11,966,647 B2
(45) Date of Patent: Apr. 23, 2024

(54) JIG DETERMINATION METHOD, PRODUCTION BASE SYSTEM, AND INFORMATION PROCESSING SYSTEM

(71) Applicant: Ryota Nakazato, Kanagawa (JP)

(72) Inventor: Ryota Nakazato, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 18/205,836

(22) Filed: Jun. 5, 2023

(65) Prior Publication Data

US 2023/0418533 A1    Dec. 28, 2023

(30) Foreign Application Priority Data

Jun. 22, 2022  (JP) .................. 2022-100269

(51) Int. Cl.
| | | |
|---|---|---|
| *G06F 3/12* | (2006.01) | |
| *B41J 3/407* | (2006.01) | |
| *B41J 29/38* | (2006.01) | |

(52) U.S. Cl.
CPC .......... *G06F 3/1263* (2013.01); *B41J 3/4078* (2013.01); *B41J 29/38* (2013.01); *G06F 3/1204* (2013.01); *G06F 3/1261* (2013.01); *G06F 3/1265* (2013.01); *G06F 3/1272* (2013.01)

(58) Field of Classification Search
CPC .... G06F 3/1263; G06F 3/1204; G06F 3/1261; G06F 3/1265; G06F 3/1272; G06F 3/1256; G06F 3/1243; G06F 3/1208; B41J 3/4078; B41J 29/38; B41J 3/46; B41J 3/28; B41J 11/06

See application file for complete search history.

(56) References Cited

U.S. PATENT DOCUMENTS

| | | | | |
|---|---|---|---|---|
| 2015/0338801 | A1* | 11/2015 | Nishino | ............. G03G 15/2039 399/70 |
| 2017/0320339 | A1* | 11/2017 | Matsumoto | .............. B41J 11/06 |
| 2017/0341433 | A1* | 11/2017 | Omagari | .............. B41J 13/0009 |
| 2019/0243683 | A1* | 8/2019 | Botelho | .................. G06F 21/44 |
| 2020/0298589 | A1* | 9/2020 | Wakabayashi | ......... B41J 3/4073 |

FOREIGN PATENT DOCUMENTS

| | | |
|---|---|---|
| JP | 2006-256138 | 9/2006 |
| JP | 2019-171642 | 10/2019 |
| JP | 2019-530942 | 10/2019 |
| WO | WO2018/059832 A1 | 4/2018 |

* cited by examiner

*Primary Examiner* — Iriana Cruz
(74) *Attorney, Agent, or Firm* — Duft & Bornsen, PC

(57) ABSTRACT

A jig determination method, a production base system, and an information processing system. The jig determination method executed by an information processing system for controlling production of an ordered product by printing includes acquiring correspondence information associating, for each image forming apparatus, a jig attached to the image forming apparatus and the image forming apparatus, determining a jig to be attached to an image forming apparatus on standby based on the correspondence information and a jig to be used in printing of an ordered product, and outputting information indicating a change of the jig attached to the image forming apparatus on standby based on a result of the determining.

16 Claims, 21 Drawing Sheets

FIG. 6

| ITEM | EXAMPLE |
|---|---|
| ORDER ID | 12345678 |
| JOB ID | 1 |
| ORDER DATE AND TIME | 20XX/3/3 15:15 |
| CUSTOMER ID | ABC123 |
| DELIVERY DESTINATION | XXX, TOKYO |
| SKU | T-SHIRTS BLACK M |
| PRINT IMAGE | IMAGE001 M.JPG |
| PRINT POSITION | FRONT |
| TYPE OF PLATEN | L |
| CONCEPTUAL DRAWING | 12345678-1.JPG |

FIG. 7A

| SKU | T-SHIRTS BLACK M | T-SHIRTS BLACK L | ... |
|---|---|---|---|
| MATERIAL IMAGE | T-SHIRTS BLACK M.JPG | T-SHIRTS BLACK L.JPG | ... |
| SHELF NUMBER | A-3-1 | A-3-2 | ... |
| PRINT POSITION | FRONT, BACK | FRONT, BACK | ... |
| TYPE OF PLATEN | L | L | ... |
| INSPECTION ITEM | 1, 2, 3, 4 | 1, 2, 3, 4 | ... |

FIG. 7B

| 1 | WRONG FABRIC |
|---|---|
| 2 | WRONG PRINT IMAGE |
| 3 | PRINT FAILURE (BLUR, MISALIGNMENT) |
| 4 | DEFECTIVE FABRIC |
| ... | ... |

FIG. 8

| BASKET ID | STATUS |
|---|---|
| B-1 | EMPTY |
| B-2 | 12345678 |
| B-3 | 23456789 |
| ... | ... |

FIG. 9

| ORDER ID AND USER ID | MATERIAL ALLOCATION | PRETREATMENT | PRINTING | DRYING | INSPECTION | SORTING | PACKAGING | FAIL | PENDING |
|---|---|---|---|---|---|---|---|---|---|
| 12345678-1 | DONE | DONE | DONE | DONE | DONE | DONE | | 0 | x |
| 12345678-2 | DONE | DONE | DONE | DONE | DONE | | | 1 | x |
| 12345678-3 | DONE | DONE | DONE | DONE | | | | 0 | x |
| 23456789-1 | DONE | DONE | DONE | | | | | 0 | |

FIG. 10

| TYPE OF PLATEN | QUANTITY |
|---|---|
| S | 1 |
| L | 2 |
| SHOES | 1 |
| SOCKS | 1 |
| HAT | 1 |

FIG. 11

| PRINTER ID | TYPE OF PLATEN | STATUS |
|---|---|---|
| 1 | S | |
| 2 | L | X (OPERATING) |
| 3 | SHOES | |

FIG. 12

| JOB ID | TYPE OF PLATEN | PRINT IMAGE | PRINT COLOR SETTING | PRINT QUALITY SETTING | MEDIUM | START | END |
|---|---|---|---|---|---|---|---|
| 1 | L | IMAGE A | BLACK GARMENT | MAXIMUM SPEED | T-SHIRT | X | |
| 2 | L | IMAGE B | BLACK GARMENT | HIGH SPEED | T-SHIRT | | |
| 3 | SOCKS | IMAGE C | WHITE GARMENT | STANDARD | SOCKS | | |
| 4 | S | IMAGE D | BLACK GARMENT | HIGH IMAGE QUALITY | T-SHIRT | X | |
| 5 | L | IMAGE E | BLACK GARMENT | HIGH IMAGE QUALITY | TOTE BAG | | |
| 6 | L | IMAGE F | WHITE GARMENT | HIGH IMAGE QUALITY | TOTE BAG | | |

FIG. 13

| | ITEM | NOTE | PROCESS MANAGEMENT | MATERIAL ALLOCATION | PRINTING | INSPECTION | SORTING | PACKING |
|---|---|---|---|---|---|---|---|---|
| x | ORDER ID | IDENTIFICATION NUMBER OF ORDER | A | B | B | B | A | |
| x | JOB ID | IDENTIFICATION NUMBER OF JOB | A | A | A | A | A | A |
| x | ORDER DATE AND TIME | DATE AND TIME OF ORDER | A | B | B | B | B | A |
| x | CUSTOMER ID | IDENTIFICATION NO. OF CUSTOMER | C | B | B | B | B | B |
| | DELIVERY DESTINATION | NAME AND ADDRESS | C | B | B | B | B | A |
| | SKU | IDENTIFICATION NUMBER OF FABRIC (SERIES, COLOR, SIZE) | C | A | A | A | B | A |
| | PRINT IMAGE | | C | A | A | A | B | D |
| | PRINT POSITION | | C | A | A | A | B | D |
| x | TYPE OF PLATEN | | C | B | A | B | B | D |
| x | CONCEPTUAL DRAWING | MATERIAL IMAGE AND PRINT IMAGE SUPERIMPOSED | C | A | A | A | A | B |

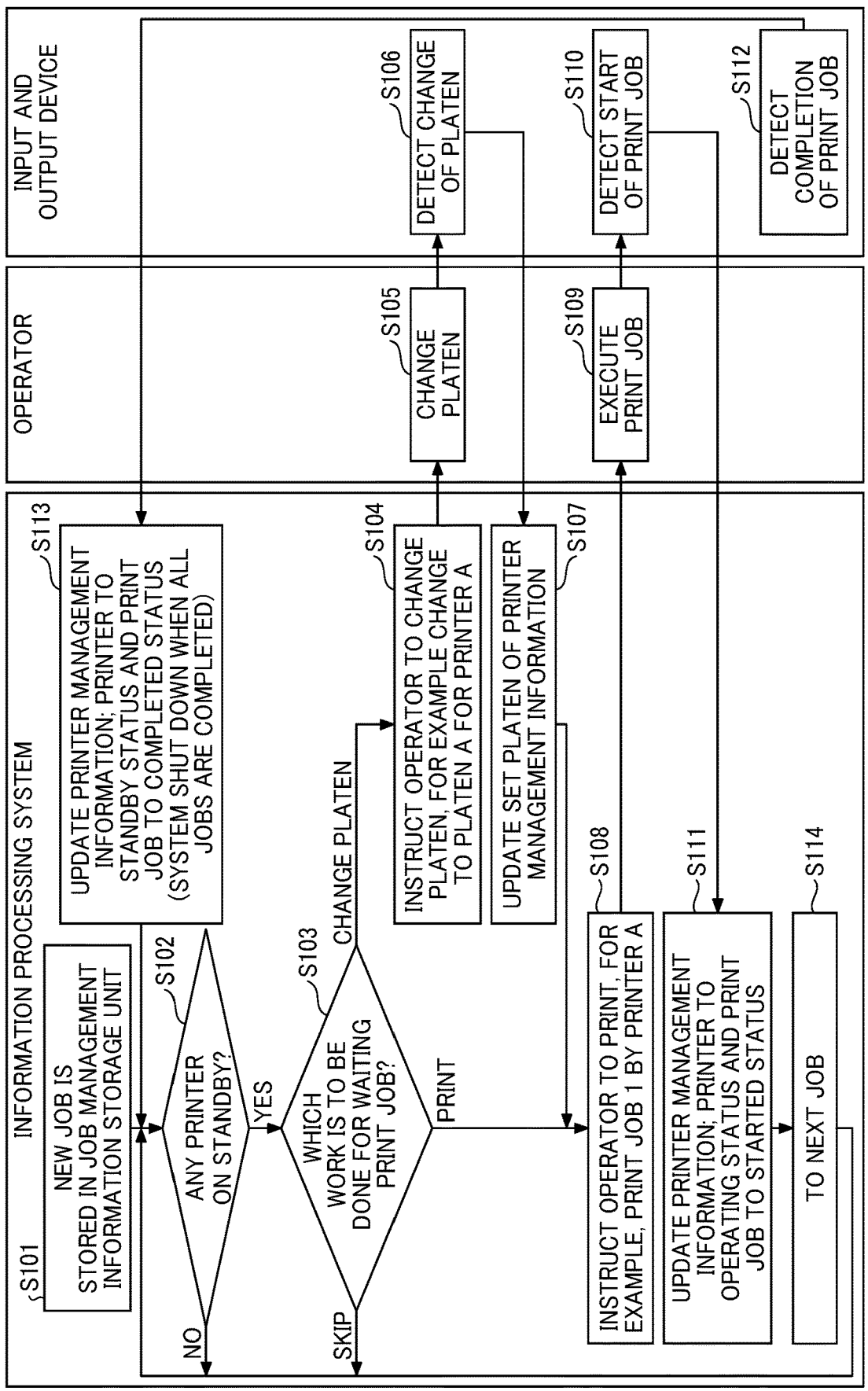

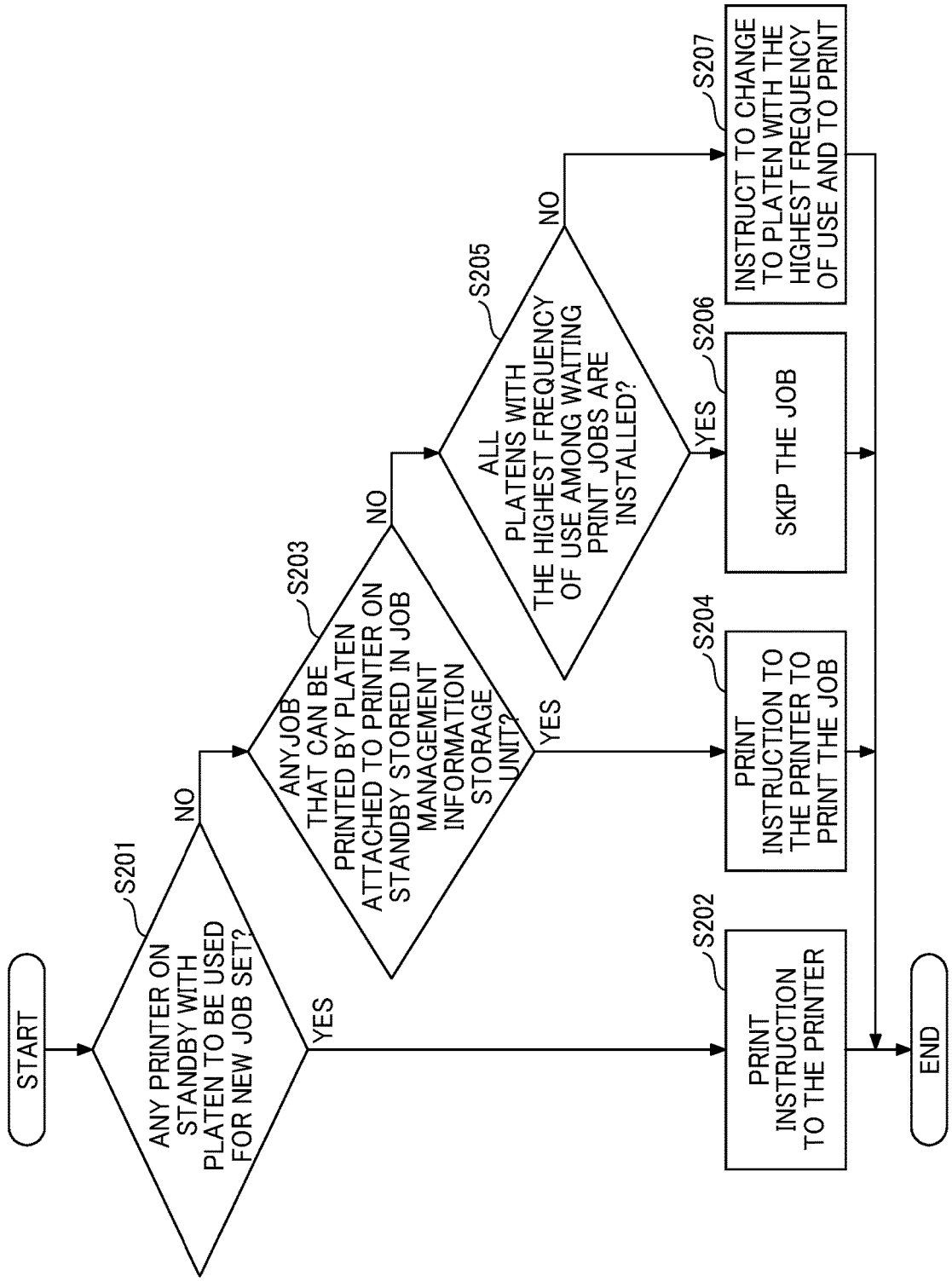

| JOB ID | PLATEN | PRINTER | START | END |
|---|---|---|---|---|
| 111 | L | 1 | X | X |
| 222 | L | 1 | X | |
| 333 | SOCKS | 2 | X | |
| 444 | S | 3 | X | |
| 555 | L | | | |
| 666 | L | | | |

| PRINTER ID | SET PLATEN | OPERATING |
|---|---|---|
| 1 | S | |
| 2 | L | X |
| 3 | SHOES | |

JIG DETERMINATION METHOD, PRODUCTION BASE SYSTEM, AND INFORMATION PROCESSING SYSTEM

CROSS-REFERENCE TO RELATED APPLICATIONS

This patent application is based on and claims priority pursuant to 35 U.S.C. § 119(a) to Japanese Patent Application No. 2022-100269, filed on Jun. 22, 2022, in the Japan Patent Office, the entire disclosure of which is hereby incorporated by reference herein.

BACKGROUND

Technical Field

The present disclosure relates to a jig determination method, a production base system, and an information processing system.

Background Art

Overproduction by speculative production and resulting mass waste of industrial products are considered to be problems to be solved for some time. In order to reduce excess production and waste, order production (on-demand production) in which a production base performs production each time an order is received, is effective. In the order production, when an electronic commerce (EC) site or the like receives the order for products such as apparel products, the EC site places the order with the production base.

A technique for improving operability by changing a processing order of print jobs so as to reduce a number of paper cassette replacement operations when printing on a paper medium is disclosed.

SUMMARY

Embodiments of the present disclosure describe a jig determination method, a production base system, and an information processing system. The jig determination method executed by an information processing system for controlling production of an ordered product by printing includes acquiring correspondence information associating, for each image forming apparatus, a jig attached to the image forming apparatus and the image forming apparatus, determining a jig to be attached to an image forming apparatus on standby based on the correspondence information and a jig to be used in printing of an ordered product, and outputting information indicating a change of the jig attached to the image forming apparatus on standby based on a result of the determining.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 6 is a table illustrating an example of order information;

FIGS. 7A and 7B are example tables illustrating setting information stored in a setting information storage unit;

FIG. 8 is an example table illustrating basket information stored in a basket information storage unit;

FIG. 9 is an example table illustrating management information stored in a management information storage unit;

FIG. 10 is an example table illustrating platen management information stored in a platen management information storage unit;

FIG. 11 is an example table illustrating printer management information stored in a printer management information storage unit;

FIG. 12 is an example table illustrating job management information stored in a job management information storage unit;

FIG. 13 is an example table illustrating display management information displayed by a workflow management unit included in the order information;

FIG. 21 is a flowchart illustrating an example of a process in which a determination unit determines the DTG printer to assign a print job and whether to change a platen;

FIG. 22 is a flowchart illustrating an example of a process for determining work content of a waiting print job;

Figure 1:
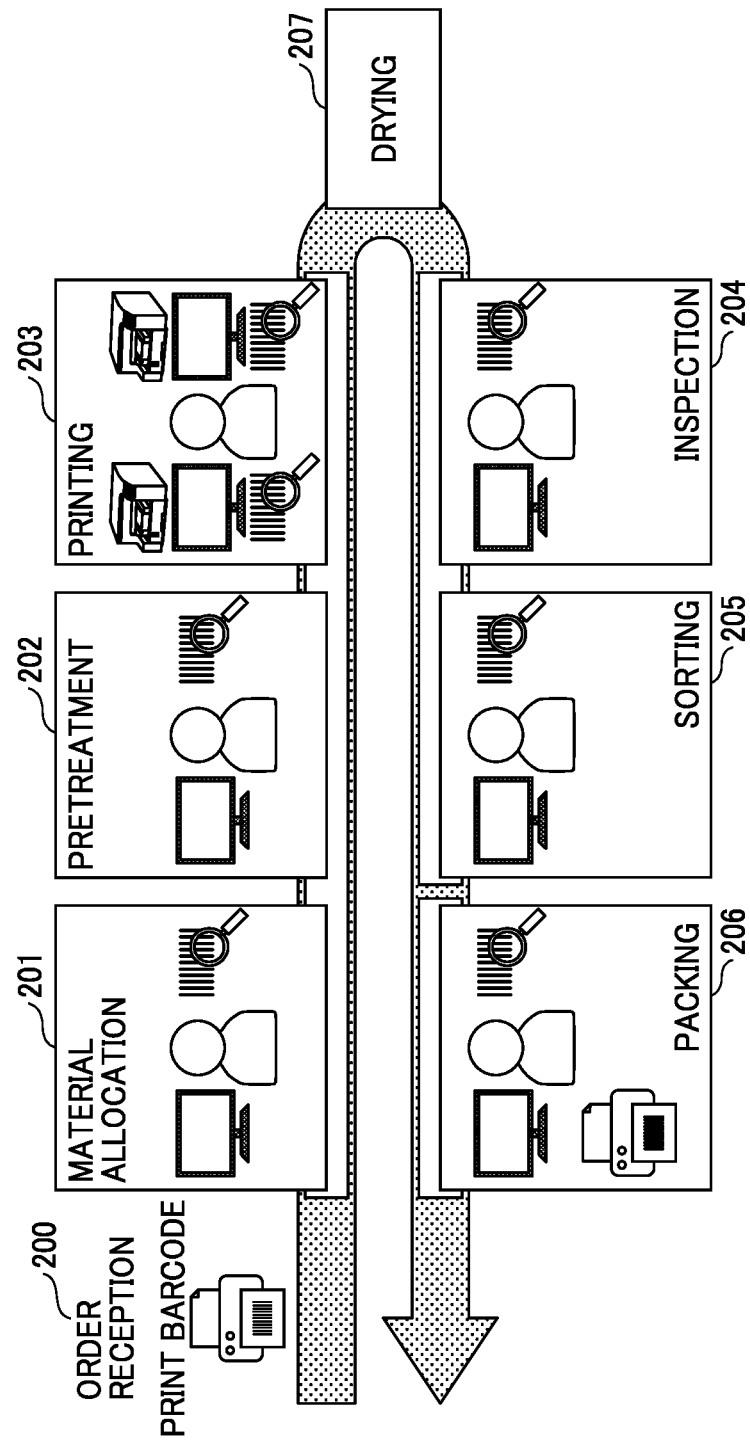
FIG. 1 is a diagram illustrating a production process and workflow of direct-to-garment (DTG) printing, according to an embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, a description is given of embodiments of an information processing system and a jig determination method performed by the information processing system with reference to the drawings.

In the present embodiment, the information processing system determines a DTG printer to assign a print job by the following determination method, and also determines whether to change an attached platen of the DTG printer.
(1) The print job is assigned to a DTG printer on standby, mounted with a platen to be used in a new print job.
(2) The print job is assigned to the DTG printer on standby, mounted with a platen to be used in a waiting print job.
(3) The print job is skipped, and the information processing system waits until the DTG printer becomes available, in the case the most frequently used platen among the platens used in the waiting print jobs is attached to each of all available DTG printers.

In the case the most frequently used platen is not attached to any DTG printer, the instruction is made to change to the most frequently used platen.

As described above, the platen is changed based on the platen to be used in the waiting print job in addition to the operation status of the DTG printer, so products can be produced in an efficient work order regardless of a skill level of an operator. Also, the number of times the operator changes the platen is reduced.

A production process of an apparel product, as an example of an order product, by the DTG printing is described in the following. As illustrated in FIG. 1, a DTG print production process is made up of multiple processes including such as material allocation, pretreatment, printing, drying, inspection, sorting, and packing. The DTG print production process of FIG. 1 is an example. Other processes may be included or some processes may be omitted. The production process is controlled by an information processing system described below.

FIG. 1 is a diagram illustrating a production process and workflow carried out by the operator of the DTG printing.

Order receiving process 200: The order receiving process 200 determines a customer, product to be produced, delivery destination, and the like, and order information on the customer, product, and delivery destination is received at the production base. In the order receiving process 200, the order information is transmitted from an electronic commerce (EC) site or the like to an information processing system 40. The information processing system prints one barcode label for one product. In the present embodiment, a T-shirt is used as an example of the product. A clothing product such as the T-shirt is called an apparel product. A barcode label is carried through the production process together with fabric that is material of the product, and the information processing system 40 displays information according to a current process, once the operator instructs to read the barcode label in each process. The operator confirms the displayed information and performs the work according to the displayed information, or inputs any information if needed according to the displayed information.

Material allocation process 201: The material allocation process 201 is a process to secure materials to be used for the production of product. The materials to be used for the production are managed in terms of a stock keeping unit (SKU). The SKU is a minimum management unit for order placement and inventory management. The SKU varies depending on the product, but in the case of T-shirts, the SKU is the material to be printed. In the present embodiment, a plain T-shirt fabric that has already been cut and sewn is prepared. The operator reads the bar code label, for example, with a barcode reader, and instructs an input and output device 80, which is described below, to display allocation information according to the read information. The operator confirms the allocation information and prepares the fabric corresponding to the SKU of the product.

Pretreatment process 202: The pretreatment process 202 is a process for improving coloring by applying or permeating a pretreatment material to the fabric. In some examples, the pretreatment is skipped. The operator reads the bar code label, for example, with the barcode reader, and instructs the input and output device 80 to display the pretreatment information according to the read information. The operator confirms the pretreatment information and performs pretreatment on the fabric of the product.

Printing process 203: The printing process 203 is a process of printing the image ordered by the customer on the fabric with the DTG printer 72. The operator reads the bar code label, for example, with the barcode reader, and instructs the input and output device 80 to display the print information according to the read information. Based on the barcode label that is read, the information processing system 40 sends the print job to the DTG printer 72. The operator confirms the print information, sets the fabric on the platen of the DTG printer 72, and presses a start key on the DTG printer 72 to execute printing.

Drying process 207: The drying process 207 is a process of applying heat to the fabric to fix the image on the fabric. The drying process is an automatic process performed by a drying device, and the operator does not perform any operation.

Inspection process 204: The inspection process 204 is a process for determining whether the product satisfies a predetermined quality. In some examples, a sensor output is used for determination. The sensor is, for example, a camera, which captures an image of the printed product and compares the image with original image data. The sensor assists the operator by, for example, emphasizing an area that differs from the original image data.

The operator reads the bar code label, for example, with the barcode reader, and instructs the input and output device 80 to display the inspection information.

Sorting process 205: The sorting process 205 is a process of confirming that a plurality of products with same delivery destination included in one order is complete. The plurality of products with the same delivery destination ordered together is packed and shipped together in a next packing process 206. The plurality of products with the same delivery destination is referred to as a bundled product. The operator reads the bar code label, for example, with the barcode reader, and instructs the input and output device 30 to display sort information. The operator confirms the sort information and determines whether the bundled products are complete.

Packing process 206: The packing process 206 is a process of packing the products to be packed in corrugated cardboard or the like and preparing documents such as an invoice. The operator reads the bar code label, for example, with the barcode reader, and instructs the input and output device 30 to display packing information. In the packing process 206, the operator reads the barcode labels of all the products in a basket based on the packing information. The operator confirms that all the products to be packed are present, packs the products, and ships the products. In response to a confirmation that the products to be packed are ready, the information processing system 40 prints documents such as the invoice and shipping label with a printer.

As described above, in a communication system 100 (See FIG. 2) of the present embodiment, by displaying inspection items in the inspection process 204, efficient production process management is possible irrespective of the skill level of the operator. Moreover, since an inspection result is displayed in the inspection process 204, the inspection is performed irrespective of the skill level of the operator.

The medium on which the image is formed may be any recording medium, not just the fabric. The recording media include fibers (cotton, silk, linen, wool, cashmere, nylon, polyester, and the like), leathers (genuine leather, synthetic leather), metals (tinplate, copper, aluminum, stainless steel, brass, and the like), glass materials (float glass, templated glass, wired glass, tempered glass, vacuum glass, and the like), rubber material, wood, stone, and the like.

The product is useful goods (the goods are something that has some physical or mental utility in economics). The products are primarily things, but may also include services and ideas.

An apparel product is an example of the product, but the information processing apparatuses such as personal computers (PCs) and smartphones, household appliances such as televisions and refrigerators, fixtures such as tableware and furniture, and the like, may be included as long as the product can be made to order. Food may also be included.

The order is a request for production or delivery by a customer designating a product type, quantity, shape, size, and the like.

A production base is a human resource, place, or other resource that serves as a basis for production activities.

The production process refers to progress of production activities from material to product. The type of production process varies depending on the product.

A jig is a general term for instruments used to indicate and guide a working position of part and tool during processing and assembly. In the present embodiment, the jig is described by a term "platen". The platen is a table or jig that is positioned opposite a print head and moves a substrate in a sub-scanning direction during printing. Different apparel products use different platens, and even the same apparel products have different printing positions of patterns depending on the order made by the customer. In addition to the platen, the printer jig may include a discharge tray, a sorter, a folding machine, an ironing device, and the like.

Correspondence information is information indicating which jig is currently attached to (mounted on) each printer. In the present embodiment, a term "printer management information" is used.

A notification to change to the jig may be displayed on the input and output device may be displayed at the information processing system 40, or may be transmitted to a particular destination by an e-mail.

Figure 2:
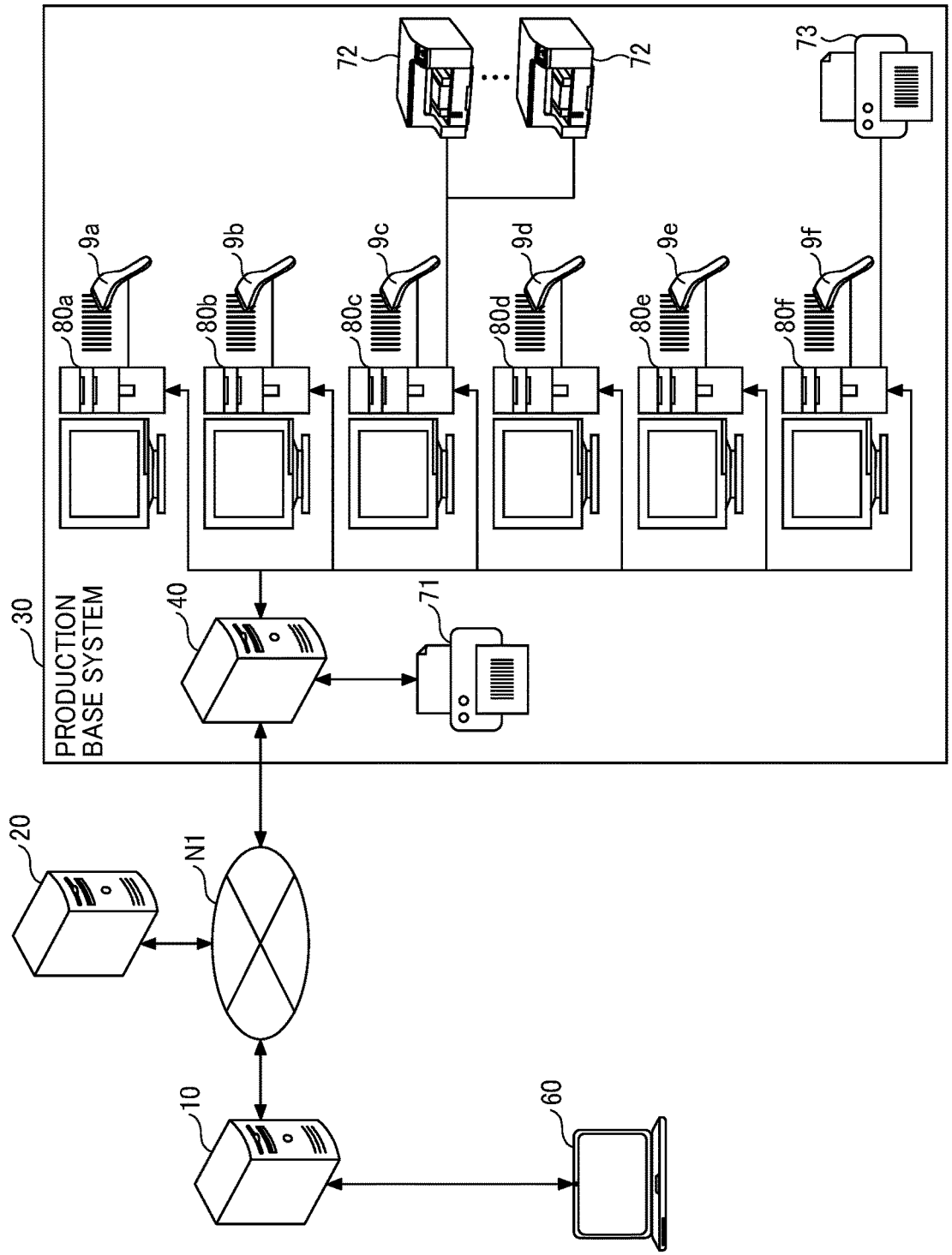
FIG. 2 is a block diagram illustrating a configuration of a communication system, according to an embodiment.

A configuration of the communication system 100 according to the present embodiment is described with reference to FIG. 2. FIG. 2 is a block diagram illustrating the configuration of the communication system 100. The communication system 100 of FIG. 2 includes an order reception system 10, a production management system 20, and the information processing system 40 provided at the production base, communicably connected through a network N1. The number of production bases is not limited to one, but may be plural.

The network N1 is a wide area network such as the internet. The network N1 may include a wide area ETHERNET (registered trademark), a virtual private network (VPN), or the like. The network N1 may be wired, wireless, or a mixture of the wired and wireless networks. The network N1 may include wireless communication such as 3G, 4G, and 5G for the mobile communication network. Also, a network N2 such as local area network (LAN), Wireless-Fidelity (Wi-Fi), or wide area network (WAN) is provided at the production base.

The terminal device 60 is an information processing terminal operated by the customer. The terminal device 60 is a desktop PC, a notebook PC, a smartphone, a tablet terminal, or the like that operates on a general operating system (OS) such as WINDOWS (registered trademark), MAC OS (registered trademark), ANDROID (registered trademark), and IOS (registered trademark), and the like. Further, the terminal device 60 may be an information processing terminal that a web browser or a native application operates and communicates with the order reception system 10.

The order reception system 10 is implemented by one or more information processing apparatuses. The order reception system 10 is, for example, the EC site. The order reception system 10 provides the terminal device 60 with a screen displaying a list of apparel products to the customer that accesses the EC site using the terminal device 60. The order reception system 10 receives order information for apparel products selected by the customer by operating the terminal device 60. The sale of apparel products and the like through the EC site is called electronic commerce (e-commerce). One or more order reception systems 10 may be provided.

Each order reception system 10 places an order to a production management system corresponding to the apparel product. The apparel products in the present embodiment are apparel products such as T-shirts, but the apparel products may be bottoms, tops, underwear, shoes, hats, bags, and the like. Further, the order reception system 10 may receive orders for products using a three dimensional (3D) printer as well as a planar printer. The order reception system 10 is operated by, for example, a brand owner. The brand owner is one who has the right to use a brand of a product. The brand is a trademark, company name, product name, and other marks that embody credibility.

The order reception system 10 of the present embodiment may not have a production factory or the like, or may have a small-scale production factory. The order reception system 10 places the order for the apparel product to the production management system 20.

The production management system 20 is one or more information processing apparatuses that receive the order information for apparel products and place an order with the production base (information processing system 40). The production management system assigns production to a production base with a short lead time (the time from receipt of an order to shipment of the product) while reducing an environmental load.

The production bases are preferred to be dispersed in various places so that production can be done near consumption areas.

The production management system 20 selects a production system from among the production bases capable of producing the product ordered by the customer so as to minimize the environmental load mainly in a production stage and in a transportation stage, and assigns production. In the production management system 20, identification information of products that can be produced at each production base, availability of materials for producing the products, and the like are updated and registered as appropriate.

A system at the production base is called a production base system 30. The production base system 30 includes one or more information processing systems 40 for receiving order information, input and output devices 80a to 80f provided in each process, and various production facilities. The input and output devices 80a to 80f respectively correspond to the material allocation, pretreatment, printing, drying, inspection, sorting, and packing. The corresponding one of the input and output devices 80a to 80f may not be provided in each process, and the same input and output device 80 may be used in a plurality of processes. According to the example of apparel product, the production facilities include one or more DTG printers 72, a cutting machine, a sewing machine, and the like. The DTG printer 72 is illustrated in FIG. 2.

Label printers 71 and 73 are also illustrated in FIG. 2 as other examples of the production facilities. Examples of the production facilities are not limited to those described above. The production base system 30 is to be provided with the production facilities corresponding to the products. The DTG printer 72 is connected to the input and output device 80c, and the label printer 73 is connected to the input and output device 80f The label printer 71 is also connected to the information processing system 40.

Note that a plurality of DTG printers 72 are used in the present embodiment. As illustrated in FIG. 2, a plurality of DTG printers 72 may be connected to one input and output device 80c. Alternatively, multiple sets of the input and output device 80c and the DTG printer 72 may be provided. Since the DTG printer 72 to input the print job is selected according to the platen attached to each DTG printer 72, the DTG printer 72 connected to the input and output device 80c used by the operator to read the bar code label may not be selected. Alternatively, the input and output device 80c and the plurality of DTG printers 72 may be connected through the network N2.

Software for managing the production of apparel products and the like is operating in the information processing system 40. With execution of such software, information regarding each process is displayed on corresponding one of the input and output devices 80a to 80f in an order determined by each apparel product, like a workflow. The operator works (performs tasks) according to the information on each process and inputs information to the input and output devices 80a to 80f Accordingly, the DTG printer 72 executes the print job in the print process 203, for example. The jobs include cutting jobs, sewing jobs, and the like, depending on the production facilities. Also, a plurality of printing processes 203 may be performed for one product.

The label printer 71 prints a barcode (an example of an identification information image) in which order information is coded on a sheet of sticker paper. The sticker-like paper is attached to the fabric such as the T-shirt. The operator reads the barcode with a barcode reading unit (such as a barcode reader) in each process. The information processing system 40 manages the production process of the product using an order identifier (ID) included in the bar code, and transmits the information on each process to the input and output devices 80a to 80f. This allows the operator to perform the work to be carried out for the process.

After the packing process 206 is completed, the label printer 73 prints the invoice, a delivery label, and the like. The label printer 71 and the label printer 73 may be the same.

The input and output devices 80a to 80f are connected to the information processing system 40, each of which is associated with each process. The input and output devices 80a to 80f are information processing terminals that communicate with the information processing system 40 through the network N2. The input and output device 80 is a desktop PC, a notebook PC, a smartphone, a tablet terminal, or the like that operates on a general operating system (OS) such as WINDOWS (registered trademark), MAC OS (registered trademark), ANDROID (registered trademark), and IOS (registered trademark), and the like. In addition, the input and output devices 80a to 80f may be information processing terminals that operate a web browser or a native application and communicate with the information processing system 40. Any input and output device 80 among the input and output devices 80a to 80f is hereinafter referred to as an "input and output device 80".

The information processing system 40 and the input and output device 80 operate, for example, as a client server system. In this case, the information processing system 40 includes function of the web server. The web server transmits various information such as a Hypertext Markup Language (HTML) document stored in the web server based on a uniform resource locator (URL) instructed by the web browser, which is the client, according to Hypertext Transfer Protocol (HTTP). A web application is executed through communication between the web browser and the web server. The web application is an application that operates through cooperation between a program written in a programming language (for example, JavaScript (registered trademark)) that runs on the web browser and a program on the web server. On the other hand, an application to be installed and executed in the input and output device 80 is called the native application. In the present embodiment, the application executed by the input and output device 80 may be the native application.

When the barcode labels are read by the barcode reading units 9a to 9f connected to the input and output device 80, the order ID and the like are transmitted to the information processing system 40. The information processing system 40 determines a current process and sends information for the current process to the input and output device 80.

The input and output device 80 may be a simple console terminal. The console terminal is a collective term for a display device such as a display used by a user and an input device such as a keyboard, or a communication terminal for a large number of users to remotely operate a large computer by a time sharing system (TSS). Information processing is performed by the information processing system 40, and input and output of information is performed by the console terminal.

The DTG printer 72 is an image forming apparatus used for drawing designs on the apparel products, such as screen printing or inkjet printing. The DTG printer 72 may print by any method as long as the DTG printer 72 has a function of drawing a pattern on the apparel products, for example. The DTG printer 72 may be a three dimensional (3D) printer.

The DTG printer 72 has different optimal ink, droplet size, temperature, ejection control, and the like depending on the fabric of the apparel product. For example, a plurality of models of DTG printers 72, such as for cotton and polyester, are provided at each production base. The DTG printers 72 different in color and dot per inch (dpi) may be provided to be suitable for different apparel products, even for printing on the same material. Also, a plurality of DTG printers 72 of the same model may be provided to enable parallel printing. In the present embodiment, description is made assuming that a plurality of DTG printers 72 of the same model are provided.

The information processing system 40 manages the operational status of the production facilities (whether there are any failure and availability of consumables) and the production schedule (whether the production facilities are available). The information processing system 40 provides the production management system 20 with the information managed by the information processing system 40.

The production management system 20 may be able to communicate with a delivery system and a core information system other than those illustrated in the figure. The delivery system is often the system of a shipping company. The delivery system performs delivery (collection and shipment) of apparel products based on the delivery destination of the apparel products input from the information processing system 40. The core information system manages customers, orders, deliveries, deposits, payments, and the like.

The order reception system 10 and the production management system 20 may reside on a cloud or on-premises. Although the information processing system 40 is residing on-premises in FIG. 2, the information processing system 40 is often residing on the cloud. The order reception system 10 and the production management system 20 may be integrated. Alternatively, the order information may be transmitted from the order reception system 10 to the production base system 30 without the production management system 20. The information processing system 40 and the order reception system 10 may be integrated without the production management system 20. Further, the information processing system may be implemented by a plurality of information processing apparatuses in which the functions of the information processing system 40 are distributed, or there may be a plurality of information processing systems 40.

Figure 3:
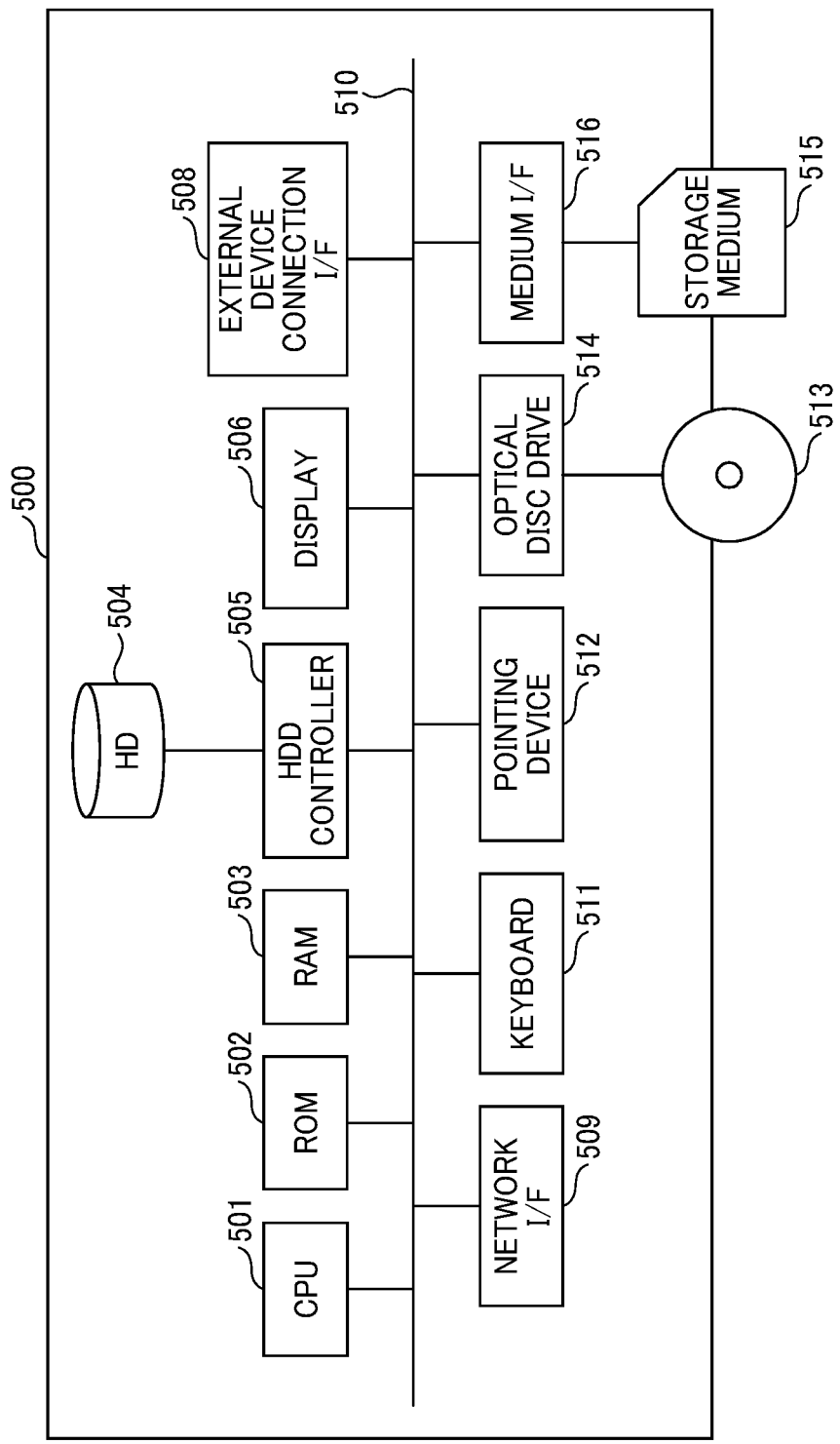
FIG. 3 is a block diagram illustrating an example of a hardware configuration of a computer.

Each of the order reception system 10, the production management system 20, the information processing system 40, and the terminal device 60 are implemented by a computer 500 as illustrated in FIG. 3. FIG. 3 is a block diagram illustrating a hardware configuration of the computer 500. As illustrated in FIG. 3, the computer 500 is implemented by a general-purpose computer, and includes a central processing unit (CPU) 501, a read only memory (ROM) 502, a random access memory (RAM) 503, a hard disk (HD) 504, a hard disk drive (HDD) controller 505, a display 506, an external device connection interface (I/F) 508, network I/F 509, a bus line 510, a keyboard 511, a pointing device 512, an optical disc drive 514, and a medium I/F 516.

Among components described above, the CPU 501 controls the overall operations of the order reception system 10, the production management system 20, the production base system 30 and the terminal device 60. The ROM 502 stores a control program such as an initial program loader (IPL) to boot the CPU 501. The RAM 503 is used as a work area for the CPU 501. The HD 504 stores various data such as programs. The HDD controller 505 controls reading and writing of various data from and to the HD 504 under control of the CPU 501. The display 506 displays various information such as a cursor, menu, window, character, or image.

The external device connection I/F 508 is an interface for connecting various external devices. The external device in this case is, for example, a USB (Universal Serial Bus) memory or various printers. The network I/F 509 is an interface that controls data communication performed with an external device through the communication network. The bus line 510 is an address bus, a data bus, or the like for electrically connecting each component such as the CPU 501 illustrated in FIG. 3.

The keyboard 511 is an example of an input device provided with a plurality of keys used for allowing a user to input characters, numerals, or various instructions. The pointing device 512 is an example of the input device that allows a user to select or execute a specific instruction, select a target for processing, or move a cursor being displayed. The optical disc drive 514 controls reading or writing of various data to an optical storage medium 513 as an example of a removable recording medium. The optical storage medium 513 may be a Compact Disc (CD), Digital Versatile Disc (DVD), BLU-RAY (registered trademark), or the like. The medium I/F 516 controls reading and writing (storing) of data from and to a storage medium 515 such as a flash memory.

Figure 4:
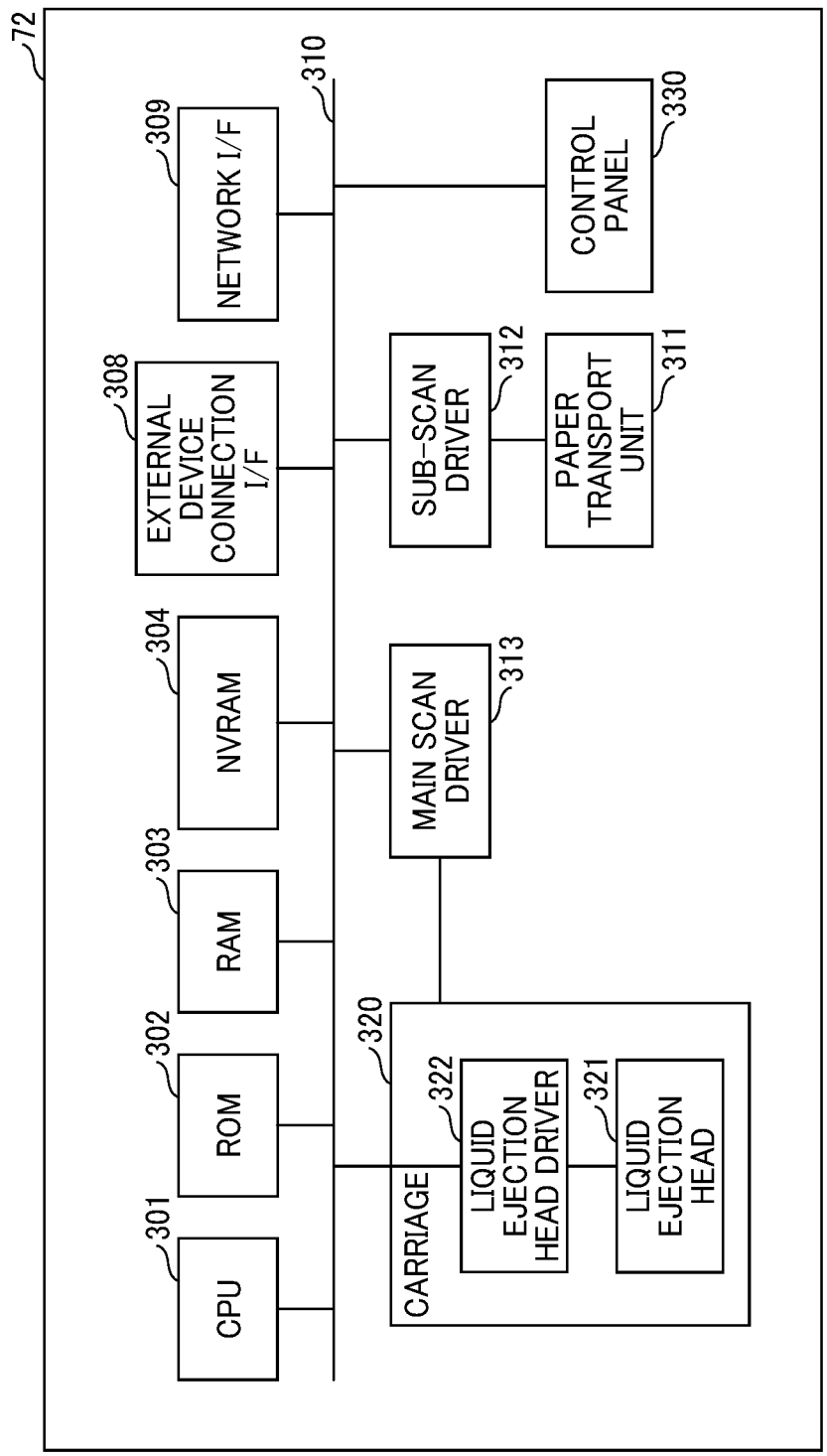
FIG. 4 is a block diagram illustrating an example of a hardware configuration of a DTG printer.

FIG. 4 is a block diagram illustrating an example of a hardware configuration of the DTG printer 72 (ink jet printer). As illustrated in FIG. 4, the DTG printer 72 includes a CPU 301, a ROM 302, a RAM 303, a Non-Volatile Random Access Memory (NVRAM) 304, an external device connection I/F 308, a network I/F 309 and a bus line 310. Further, the DTG printer 72 includes a paper transport unit 311, a sub-scan driver 312, a main-scan driver 313, a carriage 320, and a control panel 330. The carriage 320 includes a liquid ejection head 321 and a liquid ejection head driver 322.

The CPU 301 controls the overall operation of the DTG printer 72. The ROM 302 stores programs such as an initial program loader (IPL) to boot the CPU 301. The RAM 303 is used as a work area for the CPU 301. The NVRAM 304 stores various data such as programs, and retains various data even while the DTG printer 72 is powered off. The external device connection OF 308 is connected to a personal computer (PC) through a USB cable or the like and communicates control signals and data to be printed with the PC. The network OF 309 is an interface for performing data communication using the communication network such as the internet. The bus line 310 is an address bus, a data bus, or the like for electrically connecting each component such as the CPU 301.

The paper transport unit 311 is, for example, a roller and a motor that drives the roller, and transports print paper along a transport path in the DTG printer 72 in a sub-scanning direction. The sub-scan driver 312 controls operation of the paper transport unit 311 in transporting the print paper in the sub-scanning direction. The main-scan driver 313 controls the movement of the carriage 320 in the main-scanning direction.

The liquid ejection head 321 of the carriage 320 includes a plurality of nozzles for ejecting liquid such as ink and is attached to the carriage 320 such that ejection surface (nozzle surface) faces the print paper. The liquid ejection head 321 forms an image by ejecting liquid on the print paper that is intermittently conveyed in the sub-scanning direction while moving in the main-scanning direction. The liquid ejection head driver 322 is a driver for controlling the drive of the liquid ejection head 321.

The control panel 330 includes a touch panel, an alarm lamp, and the like, that display current setting values, selection screens, and the like and receives input from the operator.

The liquid ejection head driver 322 may not be included in the carriage 320 but may be connected to the bus line outside the carriage 320. Each function of the main-scan driver 313, the sub-scan driver 312 and the liquid ejection head driver 322 may be implemented by a command from the CPU 301 according to a program.

Figure 5:
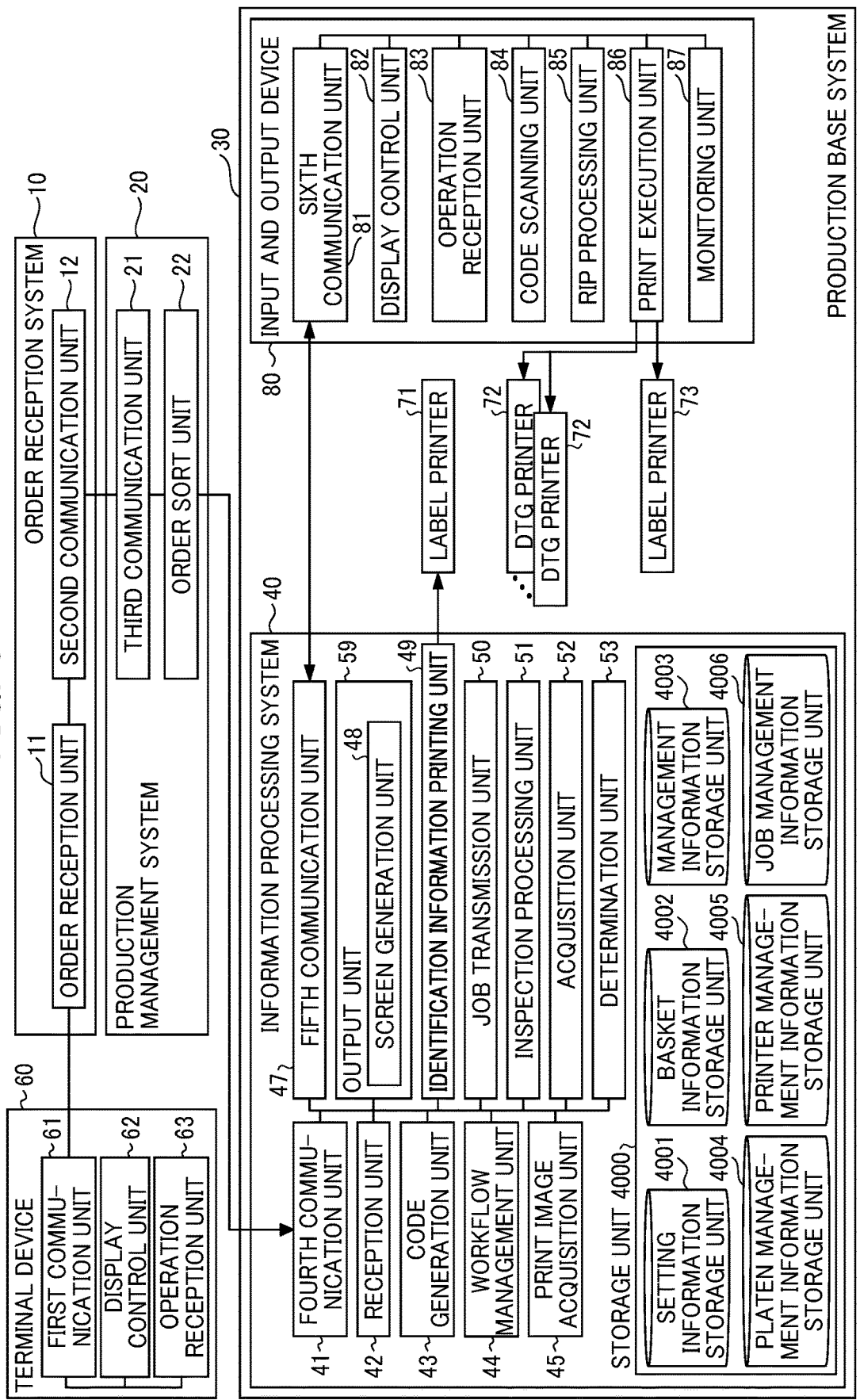
FIG. 5 is a block diagram illustrating an example of a functional configuration of a terminal device, an order reception system, a production management system, and an information processing system.

FIG. 5 is a block diagram illustrating an example of a functional configuration of the terminal device 60, the order reception system 10, the production management system 20, and the information processing system 40.

The terminal device 60 includes a first communication unit 61, a display control unit 62 and an operation reception unit 63. Each of these functions of the terminal device 60 is implemented by any one of the components illustrated in FIG. 3 operated according to an instruction from the CPU 501 based on a program (web browser or native application) deployed from the HD 504 on the RAM 503.

The first communication unit 61 communicates with the order reception system 10 to receive screen information for display of the screen of the EC site on the terminal device 60. Also, the first communication unit 61 transmits the order information input to each screen by the customer to the order reception system 10.

The display control unit 62 analyzes the screen information of the screen received from the order reception system 10 and displays the screen on the display 506. The operation reception unit 63 receives an operation of the customer on the terminal device 60 (for example, input of the order information to each screen).

The order reception system 10 includes an order reception unit 11 and a second communication unit 12. Each of these functional units included in the order reception system 10 is implemented by operating any of the components illustrated in FIG. 3 according to an instruction from the CPU 501 based on a program read from the HD 504 to the RAM 503.

The order reception unit 11 provides an EC site and receives order information of apparel products purchased by the customer through the web browser that operates on the terminal device 60 operated by the customer. Each production base system 30 transmits to the order reception system 10, information on availability of an order for each product based on inventory of fabrics, buttons, and the like to be used for the production of apparel products.

The EC site receives the order by the web application implemented through cooperation of a program executed by the web server and the web browser. The order reception unit 11 creates screen information for the screens displayed by the web browser. The screen information is a program described in HyperText Markup Language (HTML), Extensible Markup Language (XML), a script language, and Cascading Style Sheet (CSS). The structure of the web page is mainly described in HTML, the operation of the web page is described in the script language, and the style of the web page is described in CSS.

The example order information is described below with reference to FIG. 6. Although the order information created by the order reception system 10 and the order information created by the information processing system 40 are not exactly the same, the order information created by the information processing system 40 is created based on the order information created by the order reception system 10. For this reason, the order information created by the order reception system 10 and the order information created by the information processing system 40 are referred to as the order information without distinction.

The terminal device 60 may run a native application for purchasing the apparel product instead of the web application. In this case, the native application defines the configuration of the screen, and the content to be displayed is transmitted from the order reception system 10 to the terminal device 60 in XML or the like.

The second communication unit 12 transmits the order information to the production management system 20 each time an order is received. Accordingly, the second communication unit 12 transmits the order information of the ordered apparel product to the production management system 20 immediately after receiving the order.

The production management system 20 includes a third communication unit 21 and an order sort unit 22.

Each of these functional units included in the production management system 20 is implemented by operating any of the components illustrated in FIG. 3 according to an instruction from the CPU 501 based on a program read from the HD 504 to the RAM 503.

The third communication unit 21 receives order information from the order reception system 10. The order sort unit 22 selects a production base to request production from among a plurality of production bases for each piece of order information or collectively for a plurality of pieces of order information. In general, the apparel product that can be produced at each production base is different due to differences in the functions of the production facilities of the production base system 30.

The order sort unit 22 selects the production base according to the apparel product, for example, so that total environmental load in a production stage and a transportation stage becomes the smallest. For example, the order sort unit 22 selects the production base to prevent waste of the fabric in the production stage and to minimize distance between a delivery destination and the production base or transportation cost. The order sort unit 22 transmits the order information requesting production of apparel products to the selected production base.

The information processing system 40 includes a fourth communication unit 41, an order reception unit (reception unit) 42, a code generation unit 43, a workflow management unit 44, a print image acquisition unit 45, a fifth communication unit 47, a screen generation unit 48, an identification information printing unit 49, a job transmission unit 50, an inspection processing unit 51, an acquisition unit 52 and a determination unit 53.

Each of these functional units included in the information processing system 40 is implemented by operating any of the components illustrated in FIG. 3 according to an instruction from the CPU 501 based on a program read from the HD 504 to the RAM 503. Further, the information processing system 40 includes a storage unit 4000 implemented by the RAM 503 and the HD 504 illustrated in FIG. 3. In the storage unit 4000, a setting information storage unit 4001, a basket information storage unit 4002, a management information storage unit 4003, a platen management information storage unit 4004, a printer management information storage unit 4005, and a job management information storage unit 4006 are implemented.

The fourth communication unit 41 receives the order information from the production management system 20 and transmits the order information to the order reception unit 42. The order reception unit 42 creates order information managed by the information processing system 40 based on the received order information. The order reception unit 42 uses the order information to generate a print job, and sends the order information to the code generation unit 43 and the workflow management unit 44.

The code generation unit 43 encodes at least a part of the order information into a barcode or two-dimensional code. The encoded information includes at least an order ID and a job ID.

Note that the order ID and job ID may be simple numerical values or alphabetic characters without being encoded. In this case, the order ID and job ID are read by an optical character reader (OCR). Further, the barcode may be an integrated circuit (IC) chip.

The workflow management unit 44 manages the inventory status of fabrics, the operational status of production facilities (presence of failures and availability of consumables), and the production schedule (whether production facilities are available, timetable for future production). The workflow management unit 44 is connected to the production facilities to be used for production, such as the DTG printer 72, from which the status of the production facilities is sent to the workflow management unit 44. The workflow management unit 44 allocates the print job to the DTG printers 72 based on the production schedule. The workflow management unit 44 allocates to the DTG printer 72, print jobs for apparel products whose barcode labels have been read in the printing process 203. Also, the workflow management unit 44 may be able to control the order of printing by the DTG printer 72 according to the priority of the print job.

Also, the workflow management unit 44 manages the progress of the process of the ordered apparel product based on information stored in the management information storage unit 4003, which is described below. The workflow management unit 44 detects the progress of the process from the bar code information (mainly order ID and job ID) obtained by reading the bar code label by each input and output device 80, information input by the operator and notification from the DTG printer 72, and the like and registers in the management information storage unit 4003.

The print image acquisition unit 45 acquires a print image, which is the pattern to be printed on the apparel product, based on the order ID. The print image is stored on the network in a form of a file or the like.

Alternatively, the operator may design the print image, in which case the print image is sent from the production management system 20 along with the order information.

The fifth communication unit 47 transmits and receives various information to and from the input and output device 80. The fifth communication unit 47 receives the barcode information from the input and output device 80 and transmits the screen information suitable for each process to the input and output device 80.

The screen generation unit 48 generates various screen information displayed by the input and output device 80 for each production process. The screen generation unit 48 generates the screen to be displayed in each process based on the order information as described below. The screen information is created using HTML, XML, Cascade Style Sheet (CSS), JAVASCRIPT (registered trademark), and the like for the web application executed by the input and output device 80. The screen information executed by the native application installed in the input and output device 80 is held by the input and output device 80, and the displayed information is transmitted in XML or the like. The screen generation unit 48 also functions as an output unit 59 that outputs information on the platen after change. Note that the screen generation unit 48 may output information on the changed platen to a display connected to the information processing system 40.

The identification information printing unit 49 prints the barcode label generated by the code generation unit 43 using the label printer 71. Furthermore, the identification information printing unit 49 may print the invoice, the delivery label, and the like using the label printer 73.

The job transmission unit 50 transmits a print job execution request corresponding to the order ID and the job ID included in the barcode label to the input and output device 80c in the printing process through the fifth communication unit 47 in the printing process.

The inspection processing unit 51 determines whether the product is acceptable for delivery based on inspection items inspected by the operator.

The acquisition unit 52 acquires the identification information of the platen attached to the DTG printer 72 from the input and output device 80c through the fifth communication unit 47, and updates the printer management information storage unit 4005.

The determination unit 53 refers to the platen management information and job management information to determine the DTG printer 72 to assign the print job. The determination unit 53 determines whether to replace the platen, and based on determination to replace the platen, determines the platen to be used.

FIG. 6 is a table illustrating an example of the order information. The order information is information related to an apparel product order. The order information includes the delivery destination, SKU, and print position which are determined by the customer and sent from the order reception system 10. As for the print image, identification information for identifying the print image may be transmitted from the order reception system 10, or print image data may be transmitted from the order reception system 10.

The order ID is identification information for uniquely identifying an order. The ID is a name, a code, a character string, a numerical value, or a combination of one or more of the name, the code, the character string, and the numerical value used to uniquely distinguish a specific object from a plurality of objects. The order reception unit 42 assigns the order ID. A plurality of apparel products ordered in one order and addressed to the same delivery destination is packed in the same package. In this case, although there is one order ID, one job ID is assigned to each apparel product.

The job ID is identification information of the print job. The print jobs are provided for the number of times of printing to be performed to produce one apparel product. One job ID is assigned to one apparel product completed by one printing (for example, a T-shirt). The order reception unit 42 assigns the order ID.

The order date and time is the date and time when the information processing system 40 received the order information.

The customer ID is the identification information of the customer who ordered the apparel product. Past customers are recorded, and the same customer ID is assigned to the same customer. For a first-time customer, the order reception unit 42 assigns the customer ID.

The delivery destination is the delivery destination of the apparel product.

The SKU is the identification number of the fabric that identifies one type from various series, colors and sizes. In other words, the SKU is the identification information of the fabric on which the print image is printed. By using the SKU, fabrics of the same product that differ in color, size, package, and the like, are treated as being different.

The print image is the image to be printed on the fabric.

The print position indicates on which part of the fabric the print image is to be printed (front, back, chest, arm, and the like).

A type of platen is the type of the platen to be used in the print job. The type of platen is determined by a combination of SKU and print position based on setting information described below.

The conceptual drawing is an image obtained by superimposing the printed image on the material image as described below.

FIGS. 7A and 7B are tables illustrating the setting information stored in the setting information storage unit 4001. FIG. 7A illustrated the setting information. The setting information is information registered in advance by an administrator or the like among the information displayed in the process. The setting information is stored for each SKU.

The SKU is equivalent to the order information.

The material image is an image of the fabric before printing. Accordingly, the material image presents the image of the SKU.

A shelf number is the identification information of the shelf where the fabric is stored.

The print position is the position on the fabric where the DTG printer 72 prints the print image on the SKU.

The type of platen is the type of platen that is most suitable for the SKU. The type of platen (for shoes, for hats, and the like) corresponding to the SKU may also be specified.

An inspection item is an item for inspection of the inspection process 204 for the SKU (apparel product).

FIG. 7B illustrates the inspection item information. The inspection item information is the item to be inspected, which is displayed by the input and output device 80 in the inspection process 204. The inspection item may differ for each SKU, or may be common regardless of the SKU.

FIG. 8 is a table illustrating basket information stored in a basket information storage unit 4002. A basket is a container in which apparel products delivered in each process are temporarily stored. The information processing system 40 designates the basket for an order with bundled products.

A basket ID is the identification information of the basket. All basket IDs in the production base are registered. Some baskets may not be used.

A status is a status of each basket. Except for the basket with status "empty", the order ID to which the basket was assigned is registered.

FIG. 9 is a table illustrating management information stored in the management information storage unit 4003. The management information is information for managing a progress of the print job in each process. "Done" is registered for a completed process. The progress of the process is mainly detected by reading the barcode label. In addition, a failure count is registered for each print job. For example, for each failure in the inspection process 204, the failure count increases by one. In response to a pressing of a pending button in the packing process 206, "X" is registered in a pending column. The pressing of the pending button also causes all jobs with the same order ID to suspend. After a certain period of time since the pressing of the pending button, the workflow management unit 44 displays on the input and output device 80f that there is a pending basket, and prompts the operator to pack the apparel products in the basket.

FIG. 10 is a table illustrating platen management information stored in a platen management information storage unit 4004. The platen management information indicates the number of platens owned by the production base. The administrator of the production base registers the platen management information in the information processing system 40 in advance. The platen management information is referred to by the determination unit 53 to determine whether all platens of the same type are attached to the DTG printers 72.

FIG. 11 is a table illustrating printer management information stored in the printer management information storage unit 4005. The printer management information includes the platen attached to the DTG printer 72 at the production base and operating status of the DTG printer 72. The printer management information is transmitted in real time from the monitoring unit 87 of the input and output device 80 to the information processing system 40.

FIG. 12 is a table illustrating job management information stored in the job management information storage unit 4006. The job management information is a list of multiple print jobs created by the order reception unit 42. The job ID, type of platen, and print image are the same as those of the order information. The print color setting and print quality setting are determined by the order reception unit 42 according to the SKU and the like. The print color setting is a color setting, determined according to the fabric, so that white ink is not used on the white fabric, for example. The print quality setting is for a purpose of changing print speed depending on the fabric. A medium is a type of fabric defined by the SKU. Also, start item and end item respectively indicate whether the print job has started and whether the print job has ended. The start and end are transmitted in real time from the monitoring unit 87 of the input and output device 80 to the information processing system 40.

Note that the print job may be registered in the job management information at the start of the printing process 203 (simultaneous with the reading of the barcode label) or immediately after receiving the order. In the present embodiment, the former is assumed, but the registration may be made immediately after receiving the order.

Returning to FIG. 5, the description continues. The input and output device 80 includes a sixth communication unit 81, a display control unit 82, an operation reception unit 83, a code reading unit 84, a Raster Image Processor (RIP) processing unit 85, a print execution unit 86 and a monitoring unit 87. Each of these functional units included in the input and output device 80 is implemented by operating any of the components illustrated in FIG. 3 by an instruction from the CPU 501 according to a program read from the HD 504 to the RAM 503.

The sixth communication unit 81 (an example of a second communication unit) transmits and receives various information to and from the information processing system 40. The sixth communication unit 81 transmits barcode information to the information processing system 40 and receives screen information suitable for each process and RIP-processed print image from the information processing system 40.

The display control unit 82 analyzes screen information and displays information of each process. The operation reception unit 83 receives an operation of the operator on the input and output device 80.

The code reading unit 84 controls the barcode reading unit to decode the information (order ID and job ID) included in the barcode.

The RIP processing unit 85 creates RIP data compatible with the DTG printer 72. RIP is an abbreviation for Raster Image Processor, which converts a print image, which is digital data created by various applications, into a format such as a bitmap suitable for printing.

Depending on the DTG printer 72, for example, different inks (for example, yellow, magenta, cyan, and black (YMCK) or yellow, magenta, cyan, black, and white (YMCK+W)) are used for each model, amount of each color ink applied varies depending on the color to be reproduced, and data format that can be recognized by the printer is different. The RIP processing unit 85 creates appropriate RIP data for the DTG printer 72.

The print execution unit 86 prints the RIP processed print image with the DTG printer 72. Furthermore, the print execution unit 86 may print the invoice, the delivery label, and the like using the label printer 73.

The monitoring unit 87 monitors the operation status of the DTG printer 72 using a communication protocol such as the Simple Network Management Protocol (SNMP). Each DTG printer 72 is equipped with a sensor for detecting the platen, and the monitoring unit 87 acquires the platen attached to the DTG printer 72 from the DTG printer 72. The monitoring unit 87 transmits the operating status of the DTG printer 72 and the attached platen to the information processing system 40 through the sixth communication unit.

With reference to FIG. 13, information displayed on the input and output device 80 by the screen generation unit 48 in each process is described. FIG. 13 is a table illustrating display management information included in the order information, displayed by the screen generation unit 48. The items of the display information management table are the same as those of the order information, and indicate information displayed in each process. Symbols in the table in FIG. 13 indicate the following.

"A" indicates information to be displayed on the screen of the corresponding process.

"B" indicates information not displayed on the screen of the corresponding process.

"C" indicates information not displayed on a process management screen 150 described below, but displayed on an order details screen.

"D" indicates information used in the delivery label or invoice printed in the packing process 206 and not displayed on a packing screen.

"X" indicates information automatically generated in response to receiving the order.

Figure 14A:
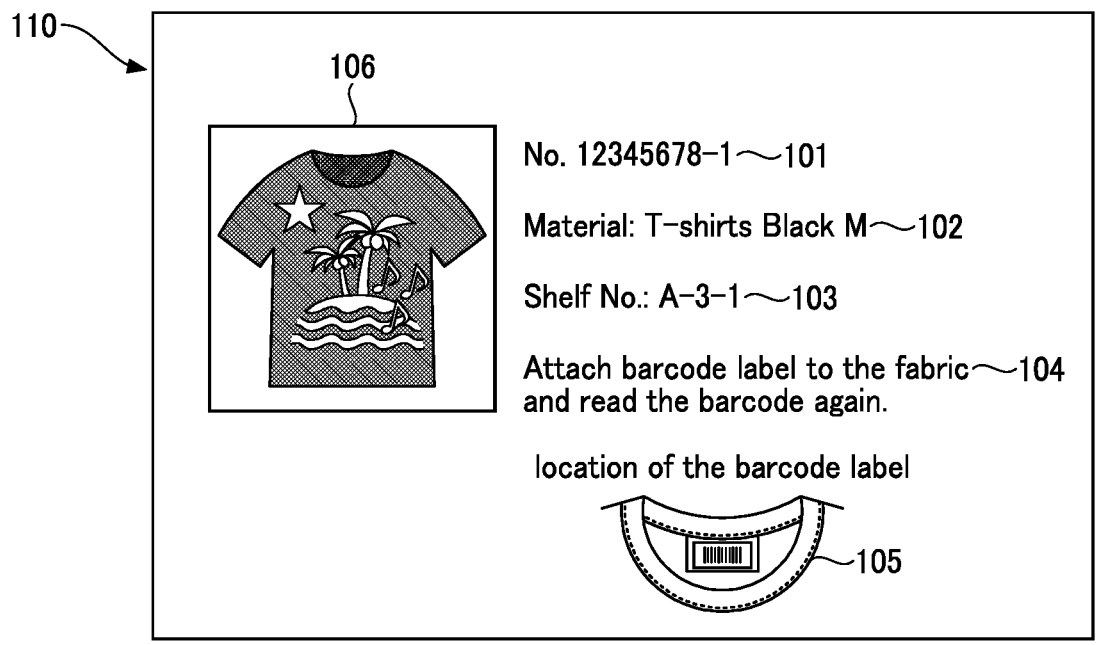
FIGS. 14A and 14B are diagrams illustrating examples of an allocation information screen and a pop-up message.

With reference to FIGS. 14A to 18C, transition of screens displayed by the input and output device 80 in each process is described. FIG. 14A illustrates an example of an allocation information screen 110 displayed by the input and output device 80 in the material allocation process 201. Allocation information is information for the operator to secure the fabric (allocate the fabric to the order). The contents displayed on the allocation information screen 110 is described below.

A character string 101 is the order ID and job ID of the ordered apparel product.

A character string 102 is the SKU.

A character string 103 is the shelf number indicating a location of the SKU. By displaying the shelf number, the operator does not have to memorize the numerous shelf numbers for each SKU. As a result, the operator is able to smoothly obtain the fabric to be used, regardless of proficiency level of the operator.

A character string 104 is the work content instructed to the operator. In FIG. 14A, "Attach a bar code label to the fabric and read the bar code again." is displayed.

An image 105 indicates a location of the barcode label on the fabric. The operator is not forced to memorize the rules for the attachment position different for each apparel product, and is able to proceed with the work regardless of the proficiency level of operator.

An image 106 is a conceptual drawing of the ordered apparel product.

Figure 14B:
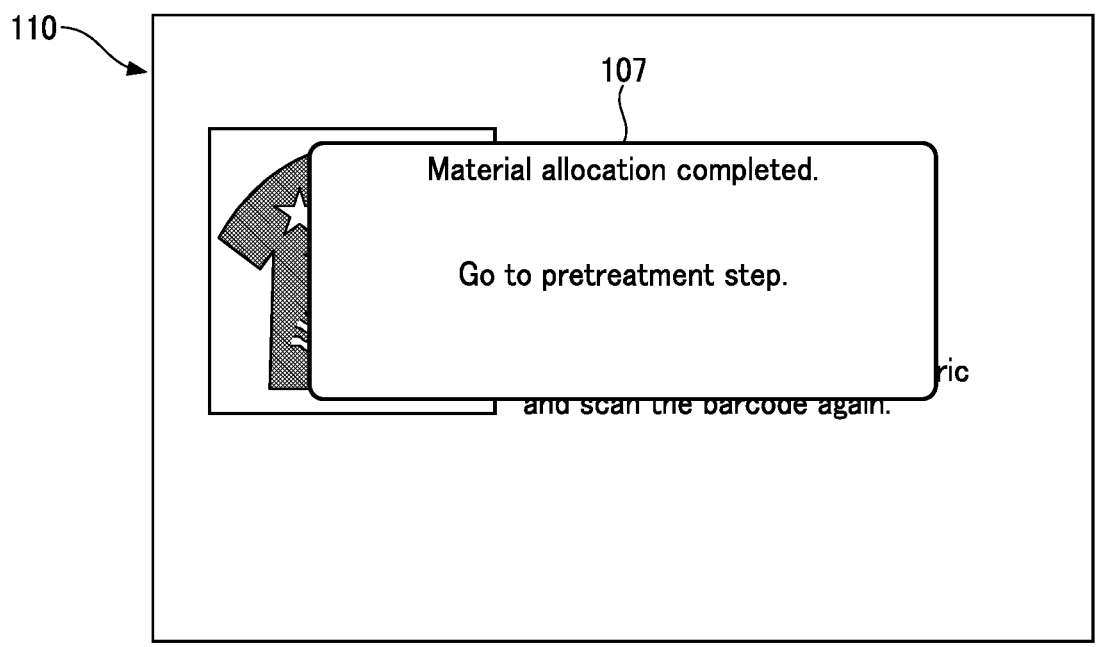

FIG. 14B illustrates a pop-up message 107 displayed on the allocation information screen 110 by reading the barcode label again. The pop-up message is displayed in response to the operator reading the barcode label again. The pop-up message 107 indicates the next process to send the fabric assigned by the operator. In FIG. 14B, a message to instruct to proceed to the pretreatment process 202 is displayed. The process to be executed next differs depending on the apparel product. For example, presence or absence of pretreatment is determined by the color of the fabric. Conventionally, the operator had to memorize combinations of fabrics and pretreatments.

In the present embodiment, the workflow management unit 44 determines and displays the next process as illustrated in FIG. 14B. As a result, the operator does not have to remember the next process, leading to maintaining a certain work efficiency. In addition, since the next process is displayed in a pop-up format, the operator is able to notice and understand the display easily.

As described below, in response to the display of the pop-up message 107, the workflow management unit 44 updates the status of the material allocation process 201 in the management information storage unit 4003 to "done".

Figure 15A:
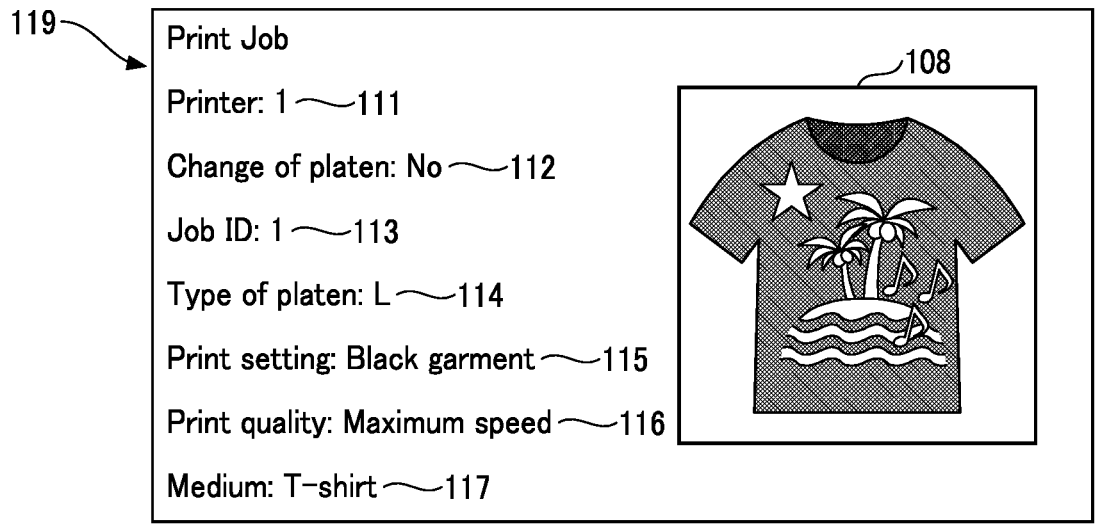
FIGS. 15A, 15B, and 15C are diagrams illustrating examples of print information screens.
Figure 15B:
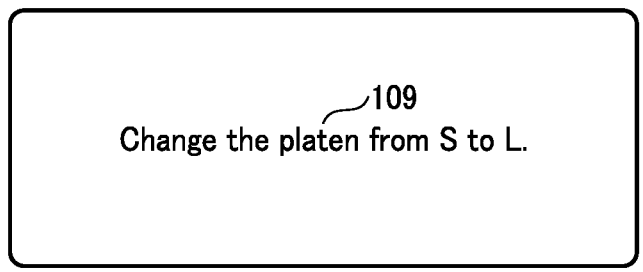
Figure 15C:
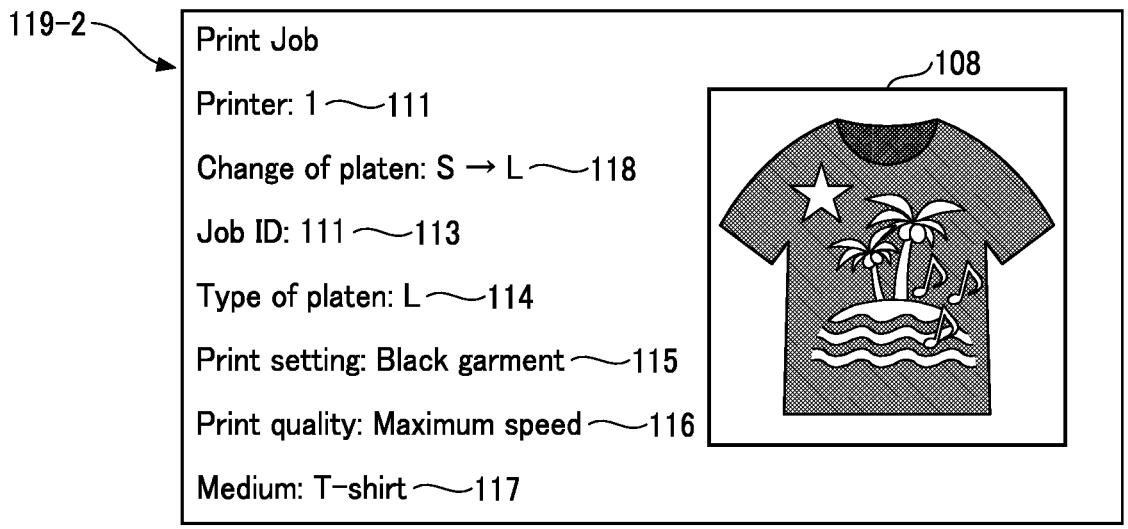

FIGS. 15A, 15B, and 15C are diagrams illustrating examples of a print information screen 119 displayed by the input and output device 80 in the printing process 203. In the description for FIGS. 15A, 15B, and 15C, the same description with the FIGS. 14A, 14B, and 14C may be skipped. The print information is information that assists the operator in printing a pattern on the fabric. The contents displayed on the printing information screen 119 is described below. In response to the reading of the barcode label by the operator in the printing process 203, the determination unit 53 determines which print job to execute, whether to replace the platen and the like, and the print information screen 119 of FIG. 15A or a platen change message 109 of FIG. 15B is displayed. FIG. 15A illustrates the case where the platen is not to be changed, and FIG. 15B illustrates the case where the platen is to be changed. The information processing system 40 automatically transmits the print job to the assigned DTG printer 72.

A character string 111 is the identification information of the DTG printer 72 that has the print job assigned.

A character string 112 indicates whether or not the platen is to be changed.

A character string 113 is the job ID.

A character string 114 is the platen to be used. Displaying the platen to be used on the print information screen 119 eliminates a load for the operator to memorize the combination of the apparel product and the platen, which facilitates confirmation and leads to smoother work.

A character string 115 is the print color setting.

A character string 116 is the print quality.

A character string 117 is the medium determined based on the SKU.

An image 108 is the conceptual drawing of the ordered apparel product. The conceptual drawing is an image diagram illustrating the print image printed on the fabric. By displaying a preview on the operation panel of the DTG printer 72, the operator is able to compare the printed image with the image 108, resulting in a reduction of printing errors.

The platen change message 109 in FIG. 15B indicates the platen before change and the platen after change. This allows the operator to change the platen without remembering the combination of the SKU and the platen.

In response to the change of the platen by the operator, the monitoring unit 87 detects the change of the platen, and the acquisition unit 52 acquires the information indicating the change of the platen and updates the printer management information storage unit 4005. Accordingly, the screen generation unit 48 displays the print information screen 119-2 of FIG. 15C. In FIG. 15C, a character string 118 displays the platen before change and the platen after change, and also displays the same information as in FIG. 15A.

The operator confirms the print information screen 119-2 and presses the start key of the DTG printer 72. The operator does not have to perform specialized works such as color adjustment, and production efficiency does not depend on the operator. In response to the transmission of the print job to the input and output device 80c, the workflow management unit 44 updates the status of the printing process 203 in the management information storage unit 4003 to "done".

Figure 16A:
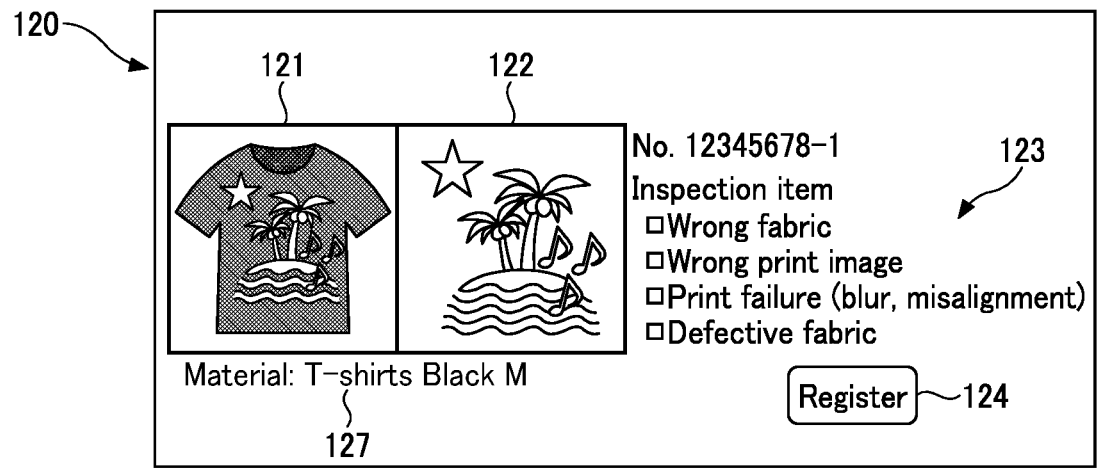
FIGS. 16A, 16B, and 16C are diagrams illustrating examples of inspection information screens and pop-up messages.

FIG. 16A illustrates an example of an inspection information screen 120 displayed by the input and output device 80 in the inspection process 204. The inspection information is information for the operator to inspect the apparel product. In the inspection process 204, in response to the reading of the barcode label by the operator, the inspection information screen 120 of FIG. 16A is displayed. The contents displayed on the inspection information screen 120 is described below.

An image 121 is a conceptual drawing of the completed product, and an image 122 is an enlarged view of the printed image. The operator confirms the condition of the apparel product on which the pattern is printed, with the images 121 and 122 as a correct result. The SKU 127 of the fabric is indicated below the images 121, and 122.

A character string 123 is a list of inspection items to be checked by the operator at the inspection. The production manager has set inspection items for each apparel product in advance as illustrated in FIG. 7B. The operator compares the images 121 and 122 with the pattern-printed apparel product according to the inspection item, and checks when there is a corresponding item. Depending on condition, there may be no check or multiple inspection items may be checked.

A registration button 124 is a button for the operator to register an inspection result in the information processing system 40. The operator compares the images 121 and 122 with the pattern-printed apparel product, checks the inspection items, and presses the registration button. Since there is just one button to operate, the operator does not have to memorize the operation procedure according to the condition of the product.

Accordingly, constant production efficiency can be maintained regardless of the experience level and ability of the operator.

Figure 16B:
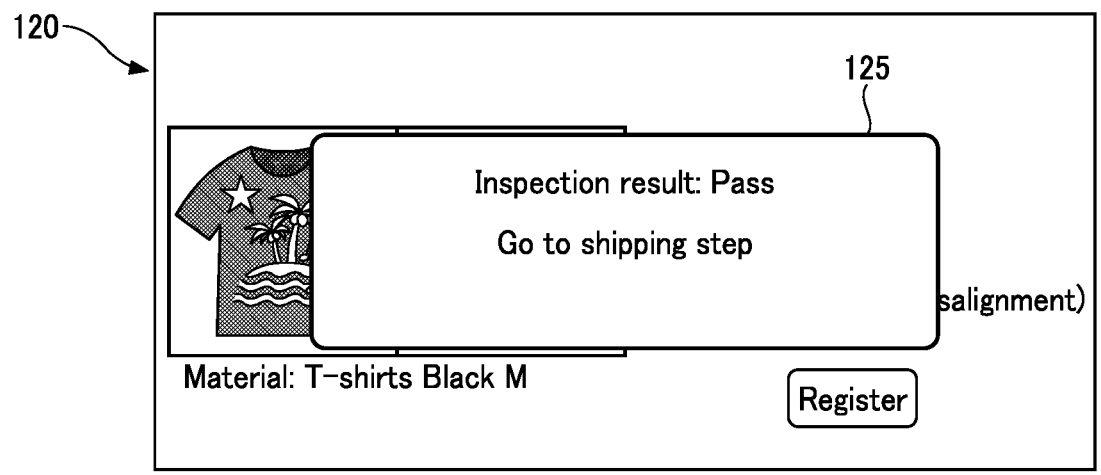

FIG. 16B illustrates a pop-up message 125 displayed by the input and output device 80 by pressing the registration button. FIG. 16B illustrates a case where the inspection result is satisfactory. A pop-up message 125 displays the inspection results and the process by which the apparel product should be sent. The information processing system 40 determines the inspection result (shipment availability) based on the items checked in the character string 123.

In the case the products are to be collected, the process to which the apparel products should be sent is also displayed, so the operator does not have to memorize the destination of the products according to the inspection result, and the work load is reduced.

In response to the display of the pop-up message 125, the workflow management unit 44 updates the status of the inspection process 204 in the management information storage unit 4003 to "done".

Figure 16C:
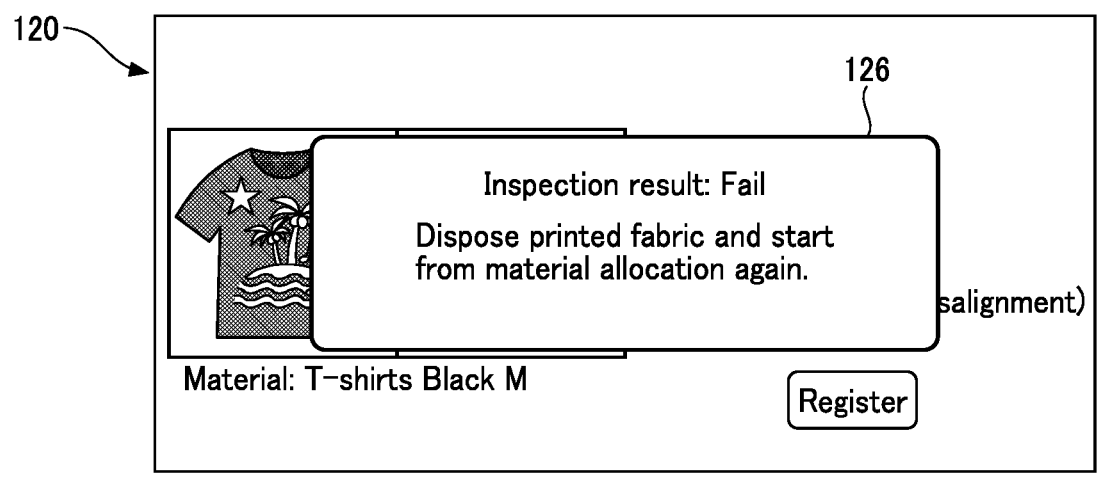

FIG. 16C illustrates a case where the inspection result is a failure. In this case, the pop-up message 126 displays that the inspection result is the failure and that the process should start from the material allocation process 201 again. Accordingly, the identification information printing unit 49 prints the barcode label again. Note that the order ID and job ID may remain the same. The workflow management unit 44 deletes "done" for all processes in the management information storage unit 4003.

Figure 17A:
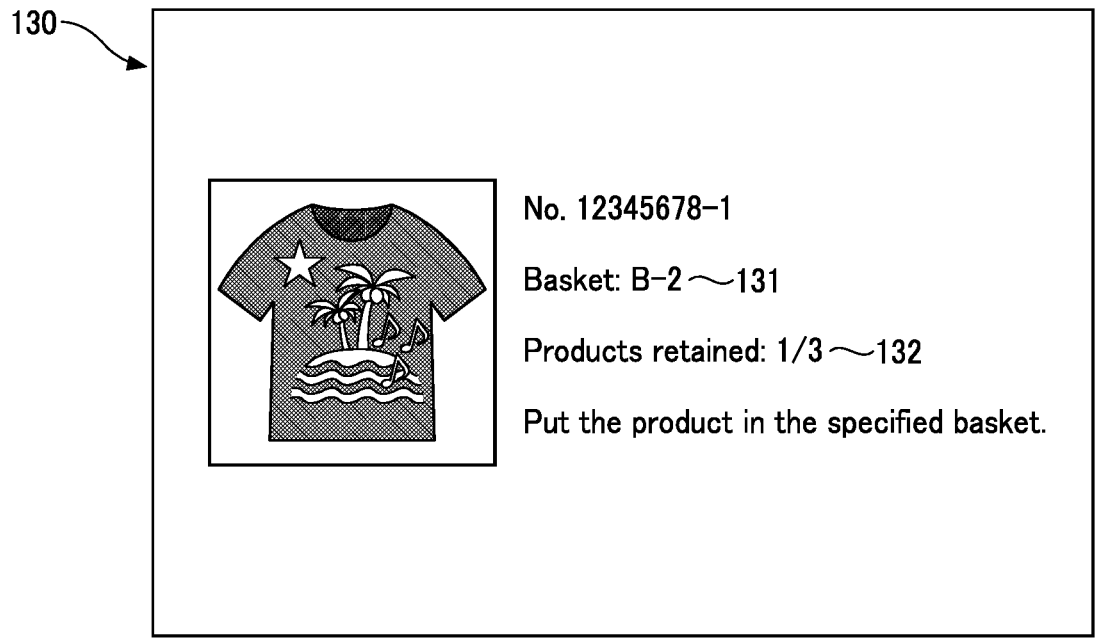
FIGS. 17A and 17B are diagrams illustrating examples of a sort information screen and a pop-up message.

FIG. 17A illustrates an example of a sort information screen 130 displayed by the input and output device 80 in the sorting process 205. The sort information is information for the operator to store the apparel products until all bundled products are prepared. In response to the reading of the barcode label by the operator in the sorting process 205, the sort information screen 130 of FIG. 17A is displayed. The workflow management unit 44 updates the status of the sorting process 205 in the management information storage unit 4003 to "done".

In the case multiple apparel products are ordered together, the operator is to pack and ship all products together. The workflow management unit 44 refers to the management information storage unit 4003 to check whether there are products ordered together in the sorting process 205 (bundled products). The bundled products are apparel products with the same order ID. The bundled products are stored in the sorting process until all production is completed. The contents displayed on the sort information screen 130 is described below.

A character string 131 indicates the basket ID. The character string 131 displays the identification information of the basket to temporarily store the bundled product whose production has not been completed. The workflow management unit 44 refers to the basket information storage unit 4002 and determines an empty basket. The workflow management unit 44 instructs the same basket for the apparel products with the same order ID. Since the operator does not have to remember and judge which baskets are empty and which baskets store which orders of apparel products, production efficiency can be maintained independent of the operator.

A character string 132 indicates the number of products completed. The character string 132 displays how many apparel products with the same order ID are completed. An error in the sorting process causes a difference between the number of apparel products in the character string 132 and the number of products in the basket, and an early detection of error becomes possible.

Figure 17B:
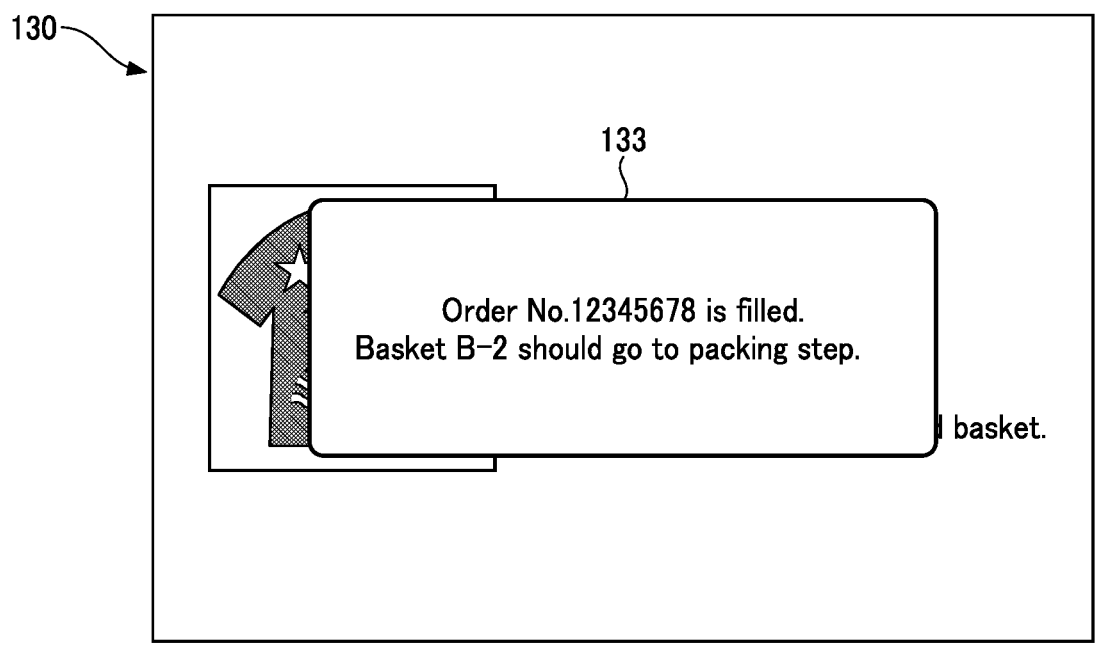

FIG. 17B illustrates a pop-up message 133 displayed in response to completion of production of all bundled products. The pop-up message 133 displays the order ID and the completion of production of the bundled products. In response to reading of the bar code label of the last apparel product with the same order ID, the input and output device 80 displays the pop-up message 133 indicating that the bundled products are complete and instructs the next process for each basket.

Figure 18A:
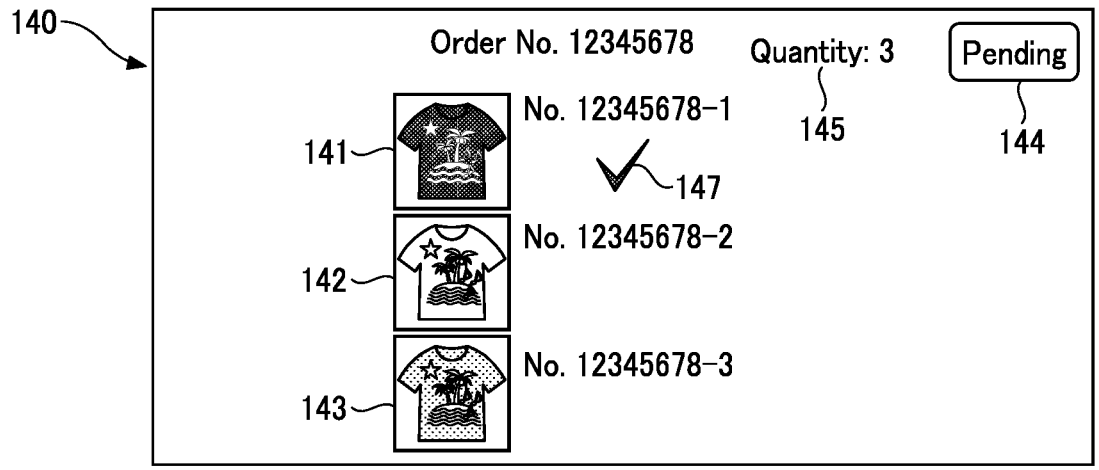
FIGS. 18A, 18B, and 18C are diagrams illustrating examples of packing information screens and pop-up messages.

FIG. 18A illustrates an example of a packing information screen 140 displayed by the input and output device 80 in the packing process 206. Packing information is information for the operator to pack all apparel products to be bundled. The packing information screen 140 of FIG. 18A is displayed in the packing process 206, in response to the reading of the barcode label of the apparel product in the basket by the operator. In the packing process 206, the operator performs final confirmation on the apparel product to be packed and then packs and ships the product. Further, documents such as invoice and shipping label are printed in the packing process. The contents displayed on the packing information screen 140 is described in the following.

Images 141 to 143 present a list of apparel products with the same order ID. In response to the reading of the barcode label of the apparel products in the basket by the operator, a check mark 147 is displayed on the images 141-143. In the case the bar code labels of all the apparel products in the basket are read and an excess or deficiency is found, the error in the sorting process 205 is detected at that stage. Further, in the case the bar code label of an apparel product that does not have the same order ID is read, an error message pops up. The print information screen 119 also displays a number of products 145 (number of jobs) included in one order.

A pending button 144 is a button for suspending the packing process 206. In the case the excess or deficiency of apparel products in the basket is found, the operator puts the basket on hold in the packing process 206. The operator proceeds with processing of other orders. The packing process 206 for the pending basket is restarted when there is no excess or deficiency of apparel products in the basket. Accordingly, even in the case the excess or deficiency of apparel products in the basket is found, a decrease in production efficiency is prevented by processing other orders.

Figure 18B:
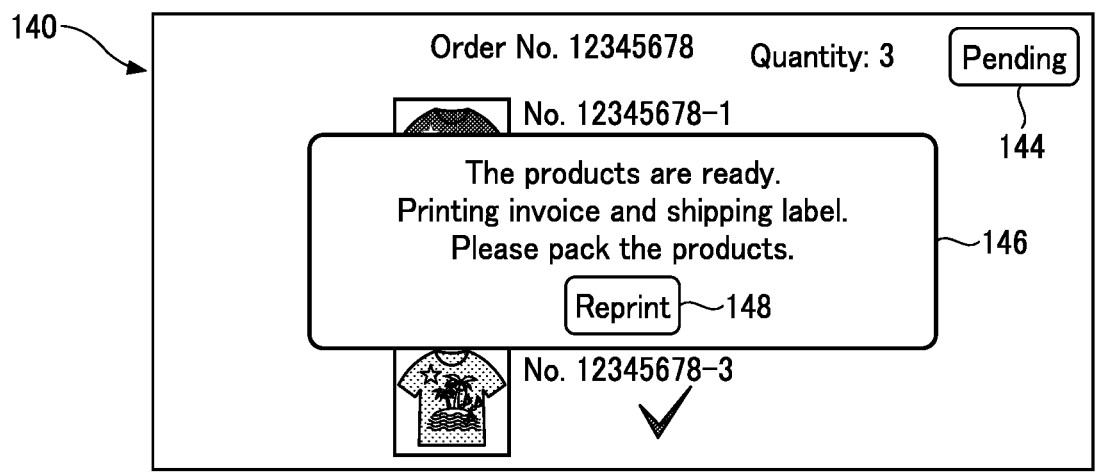

FIG. 18B illustrates a pop-up message 146 displayed by the input and output device 80, in response to the reading of all the barcode labels of the apparel products in the basket, and a confirmation by the information processing system 40 that all apparel products with the same order ID are available. The pop-up message 146 indicating, "The products are ready. Printing invoice and shipping label. Please pack the products." and a reprint button 148 are displayed.

Simultaneously with the display of the pop-up message 146, the workflow management unit 44 updates the status of packing process 206 of management information storage unit 4003 to "done" for all apparel products with the same order ID.

While the input and output device 80 is automatically printing the documents such as the invoice and the delivery label, the operator packs the product, enabling efficient production.

The reprint button 148 is a button for the operator to press in the case the document is not printed due to an error of the label printer 73 or the like.

Figure 18C:
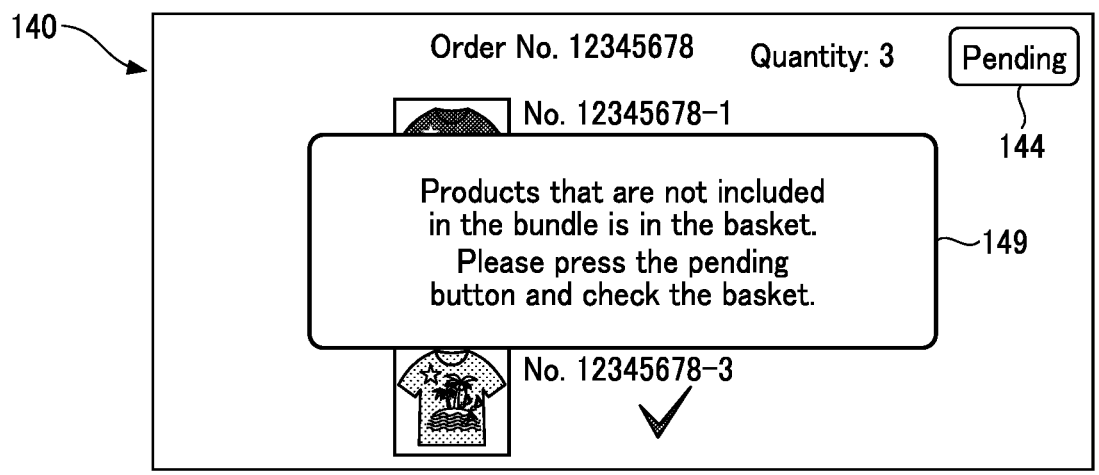

FIG. 18C illustrates a pop-up message 149 displayed by the input and output device in the case the order IDs of all the apparel products read from the barcode label by the operator from one basket are not the same. The pop-up message 149 indicates, "Products that are not included in the bundle is in the basket. Please press the pending button and check the basket." This allows the operator to avoid bundling mistakes.

Figure 19:
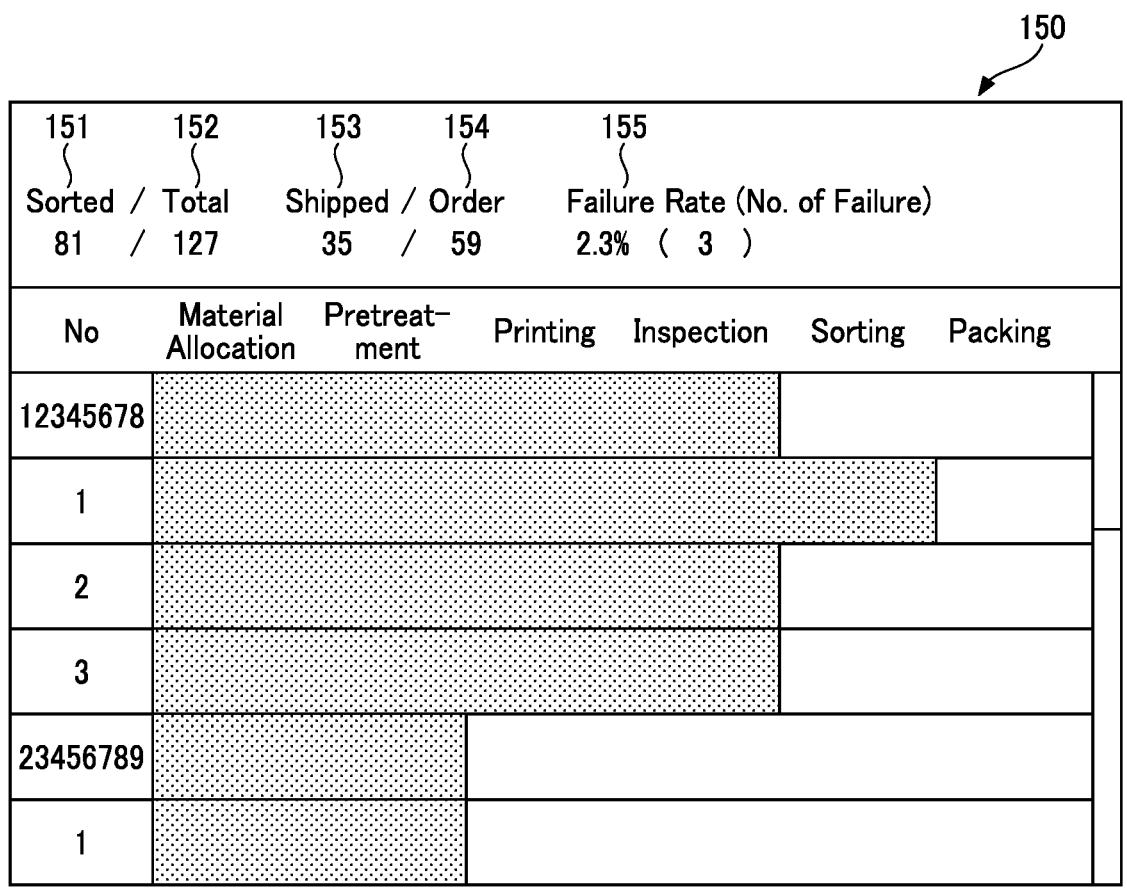
FIG. 19 is a diagram illustrating an example of a process management screen.

FIG. 19 is a diagram illustrating an example of a process management screen 150 displayed by any of the input and output devices 80. The process management screen 150 visually displays current management information stored in the management information storage unit 4003. The process management screen 150 indicates the progress of the production process in association with the order ID and the job ID. The progress indicates whether the status of each process reached "done" in the management information storage unit 4003.

The process management screen 150 also displays a sorted number 151, a total number 152, a shipped number 153, an ordered number 154, and a failure rate 155. The sorted number 151 is the number of jobs for which the sorting process 205 is "done", the total number 152 is the total number of jobs, the shipped number 153 is the number of shipped orders, and the ordered number 154 is the total number of orders. The failure rate 155 is the ratio of the total number of failures to the total number of jobs.

The administrator is able to grasp the progress of each print job of each order by the process management screen 150.

Figure 20A:
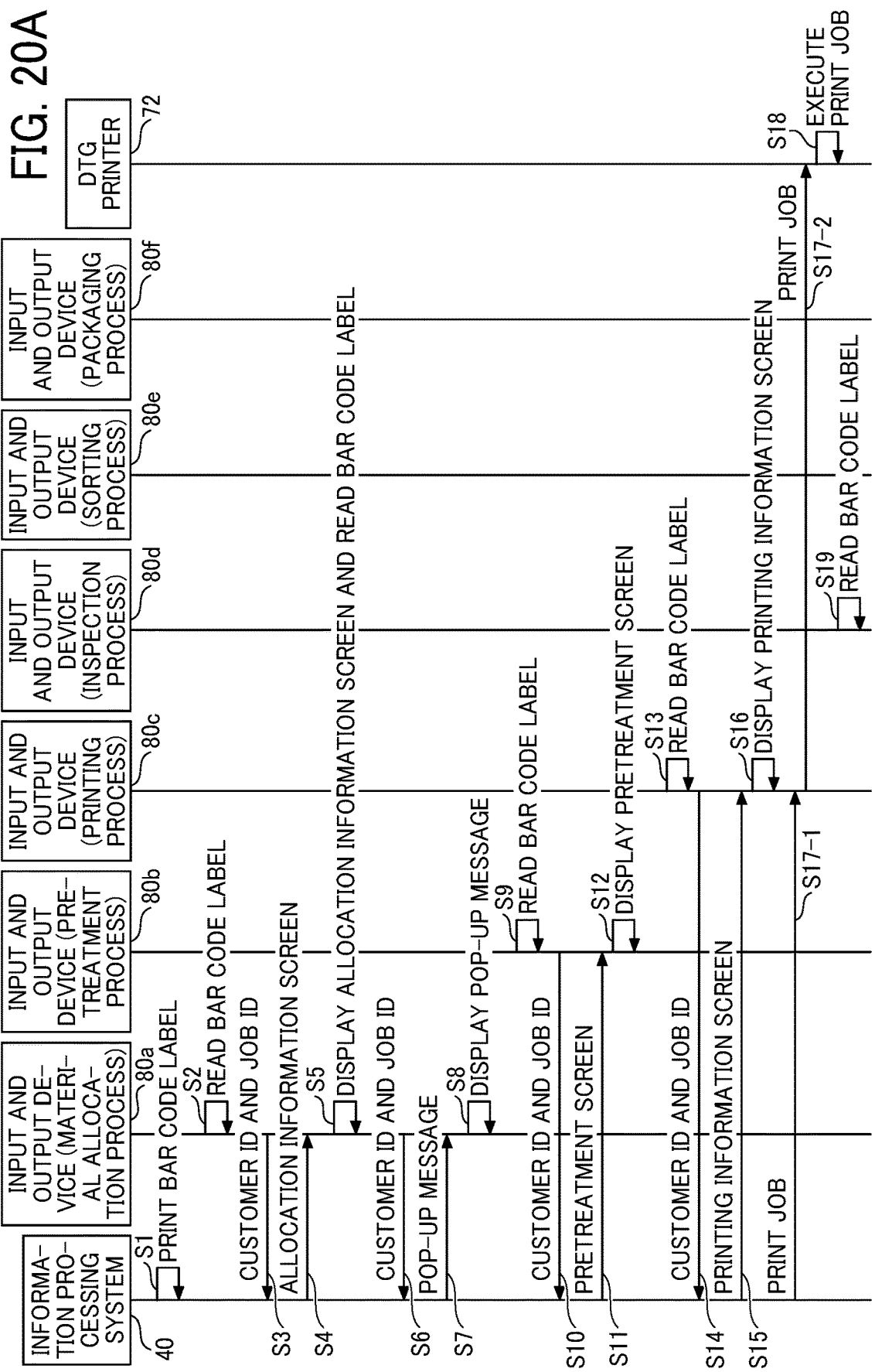
FIGS. 20A and 20B are a sequence diagram illustrating an example of a process from creation of order information to packing.
Figure 20B:
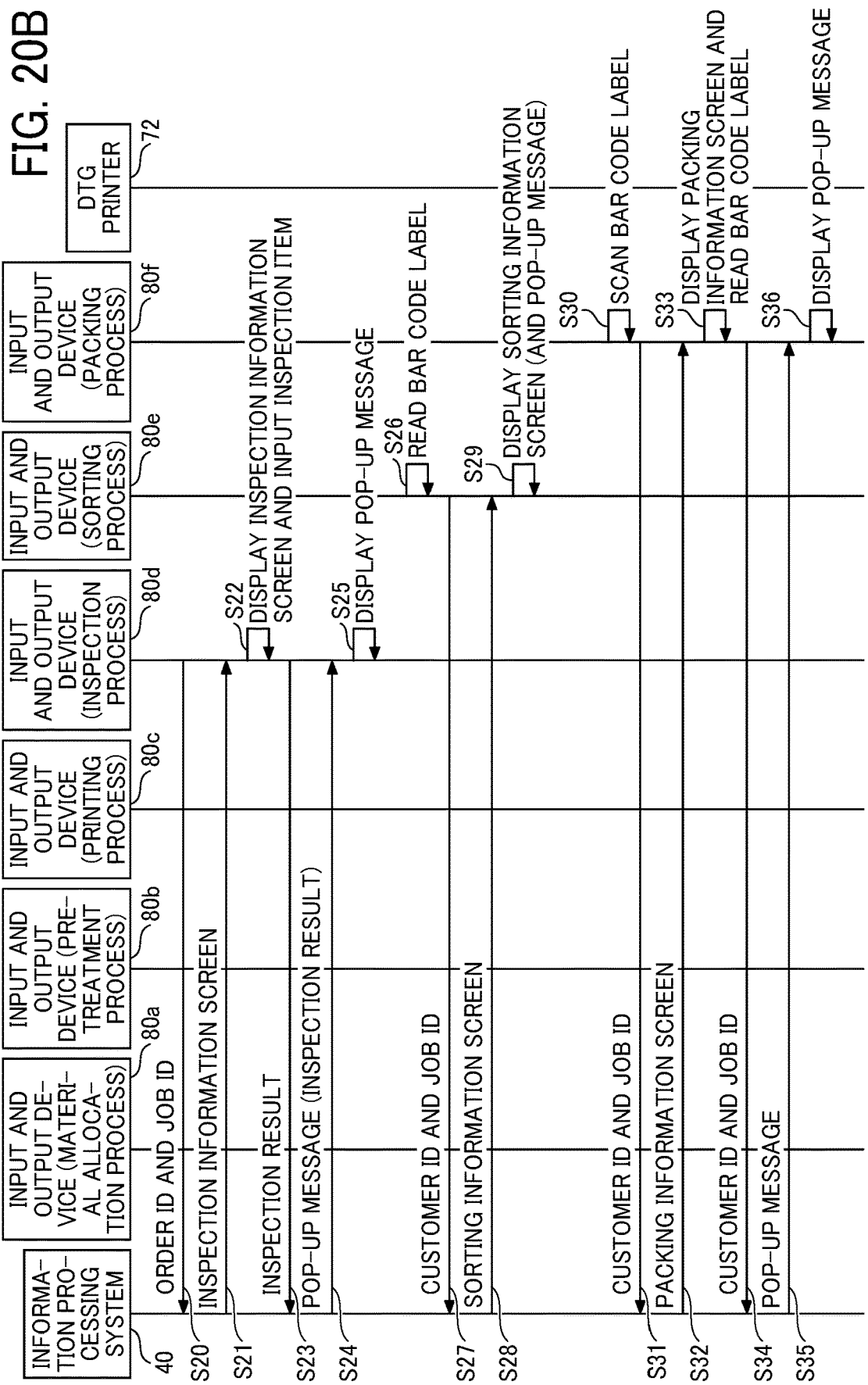

With reference to FIGS. 20A and 20B, an overall process executed by the production base system 30 is described in the following. FIGS. 20A and 20B are a sequence diagram illustrating an example of a process from creation of order information to packing. In FIGS. 20A and 20B, the input and output device 80 is assigned to each process, but one input and output device 80 may be assigned to a plurality of processes. The operator moves to the next process for each apparel product, for each basket, or for several apparel products or baskets collectively.

S1: The fourth communication unit 41 of the information processing system 40 receives the order information from the production management system 20. The order reception unit 42 uses the order information to create the order information (see FIG. 6) used within the production management system 20. The code generation unit 43 generates a barcode including an order ID and a job ID, and the identification information printing unit 49 prints the barcode label. Also, the workflow management unit 44 assigns an order ID to the basket ID of the basket information storage unit 4002 in the case there is a bundled product. Assignment of the basket may be performed at the sorting process 205. The workflow management unit 44 registers the order ID and job ID in the management information storage unit 4003.

S2: In response to the operator reading the bar code label with the input and output device 80a in the material allocation process 201, the code reading unit 84 decodes the order ID and the job ID.

S3: The sixth communication unit 81 transmits the order ID and job ID to the information processing system 40.

S4: The fifth communication unit 47 of the information processing system 40 receives the order ID and job ID, and the workflow management unit 44 acquires the current status from the management information storage unit 4003 based on the order ID and job ID. The screen generation unit 48 determines allocation information to be used in the material allocation process 201 by referring to the display information management table of FIG. 13. The screen generation unit 48 creates the allocation information screen 110 using the allocation information, and the fifth communication unit 47 transmits the screen information of the allocation information screen 110 to the input and output device 80a.

S5: The sixth communication unit 81 of the input and output device 80a receives the screen information of the allocation information screen 110, and the display control unit 82 displays the allocation information screen 110. The operator picks up the fabric from the shelf and attaches the barcode label to the fabric. In response to the operator reading the bar code label with the input and output device 80a in the material allocation process 201, the code reading unit 84 decodes the order ID and the job ID.

S6: The sixth communication unit 81 transmits the order ID and job ID to the information processing system 40.

S7: The fifth communication unit 47 of the information processing system 40 receives the order ID and job ID, and the workflow management unit 44 acquires the current status from the management information storage unit 4003 based on the order ID and job ID. In response to receiving the second order ID and job ID in the material allocation process 201, the workflow management unit 44 determines to display a pop-up message instructing to proceed to the next step. The screen generation unit 48 generates the pop-up message, and the fifth communication unit 47 transmits the pop-up message to the input and output device 80a. The workflow management unit 44 updates the status of the material allocation process 201 in the management information storage unit 4003 to "done".

S8: The sixth communication unit 81 of the input and output device 80a receives the pop-up message, and the display control unit 82 displays the pop-up message on the allocation information screen 110.

S9: In response to the reading of the bar code label by the operator with an input and output device 80b in the pretreatment process 202, the code reading unit 84 decodes the order ID and the job ID.

S10: The sixth communication unit 81 transmits the order ID and job ID to the information processing system 40.

S11: The fifth communication unit 47 of the information processing system 40 receives the order ID and job ID, and the workflow management unit 44 acquires the current status from the management information storage unit 4003 based on the order ID and job ID. In response to receiving the order ID and the job ID after the material allocation process 201 is completed, the workflow management unit 44 determines to display the information of the pretreatment process 202. The screen generation unit 48 refers to the display information management table of FIG. 13 to create a screen using the information displayed in the pretreatment process 202, and the fifth communication unit 47 transmits the screen information of the pretreatment process 202 to the input and output device 80b. The workflow management unit 44 updates the status of the pretreatment process 202 in the management information storage unit 4003 to "done".

S12: The sixth communication unit 81 of the input and output device 80b receives the screen information of the pretreatment process 202, and the display control unit 82 displays the screen of the pretreatment process 202. The operator performs pretreatment according to the instruction on the screen.

S13: In response to the reading of the bar code label by the operator with the input and output device 80c of the printing process 203, the code reading unit 84 decodes the order ID and the job ID.

S14: The sixth communication unit 81 transmits the order ID and job ID to the information processing system 40.

S15: The fifth communication unit 47 of the information processing system 40 receives the order ID and job ID, and the workflow management unit 44 acquires the current status from the management information storage unit 4003 based on the order ID and job ID. In response to receiving the order ID and the job ID after the pretreatment process 202 is completed, the workflow management unit 44 registers the print job in the job management information storage unit 4006. After that, according to the determination by the determination unit 53, the screen generation unit 48 creates a screen using the information displayed in the printing process 203, and the fifth communication unit 47 transmits the screen information of the print information screen 119 to the input and output device 80c.

S16: The sixth communication unit 81 of the input and output device 80c receives the screen information of the printing information screen 119, and the display control unit 82 displays the printing information screen 119. Details of the processing by the determination unit 53 is described below with reference to FIGS. 21 to 23. The changing of the platen is omitted in FIGS. 20A and 20B.

S17-1: The job transmission unit 50 transmits a request for execution of the print job identified by the job ID to the input and output device 80c through the fifth communication unit 47. The workflow management unit 44 updates the status of the printing process 203 in the management information storage unit 4003 to "done".

S17-2: The sixth communication unit 81 receives the print job, and the RIP processing unit 85 performs RIP processing of the print image.

S18: In response to a pressing of the start key of the DTG printer 72 according to the screen, the print execution unit 86 uses the DTG printer 72 to print the print image on the fabric.

S19: In response to the reading of the bar code label by the operator with the input and output device 80d of the inspection process 204, the code reading unit 84 decodes the order ID and the job ID.

S20: The sixth communication unit 81 transmits the order ID and job ID to the information processing system 40.

S21: The fifth communication unit 47 of the information processing system 40 receives the order ID and job ID, and the workflow management unit 44 acquires the current status from the management information storage unit 4003 based on the order ID and job ID. In response to receiving the order ID and the job ID after the printing process 203 is completed, the workflow management unit 44 determines to display the information of the inspection process 204.

The screen generation unit 48 refers to the display information management table of FIG. 13 to create a screen using the information displayed in the inspection process 204, and the fifth communication unit 47 transmits the screen information of the inspection information screen 120 to the input and output device 80d.

S22: The sixth communication unit 81 of the input and output device 80d receives the screen information of the inspection information screen 120, and the display control unit 82 displays the inspection information screen 120. The operator performs the inspection of the product according to the inspection items on the screen and presses the registration button. The operation reception unit 83 receives the inspection result of the inspection item.

S23: The sixth communication unit 81 transmits the inspection result to the information processing system 40.

S24: The fifth communication unit 47 of the information processing system 40 receives the inspection result, and the inspection processing unit 51 performs the processing described below to determine the inspection result (pass, fail). An inspection result "pass" indicates that the product is acceptable for shipment, and an inspection result "fail" indicates that the product is not acceptable for shipment. In response to receiving the inspection result "pass", the workflow management unit 44 updates the status of the inspection process 204 in the management information storage unit 4003 to "done". In response to receiving the inspection result "fail", the workflow management unit 44 deletes "done" for all processes in the management information storage unit 4003 and increments the failure count in the management information storage unit 4003 by one. The fifth communication unit 47 transmits a pop-up message indicating whether the inspection result is "pass" or "fail" to the input and output device 80*d*.

S25: The sixth communication unit 81 of the input and output device 80*d* receives the pop-up message, and the display control unit 82 displays the pop-up message on the inspection information screen 120. The description continues assuming that the inspection result is "pass".

S26: In response to the operator reading the bar code label with the input and output device 80*e* of the sorting process 205, the code reading unit 84 decodes the order ID and the job ID.

S27: The sixth communication unit 81 transmits the order ID and job ID to the information processing system 40.

S28: The fifth communication unit 47 of the information processing system 40 receives the order ID and job ID, and the workflow management unit 44 acquires the current status from the management information storage unit 4003 based on the order ID and job ID. In response to receiving the order ID and the job ID after the inspection process 204 is completed, the workflow management unit 44 determines to display the information of the sorting process 205. The workflow management unit 44 updates the status of the sorting process 205 in the management information storage unit 4003 to "done". The workflow management unit 44 identifies the basket ID associated with the same order ID from the basket information storage unit 4002. The workflow management unit 44 also refers to the management information storage unit 4003 to identify the number of print jobs with the same order ID and the number of sorted print jobs. The screen generation unit 48 refers to the display information management table of FIG. 13 to identify information to be displayed in the printing process 203. The screen generation unit 48 generates a screen using the basket ID, the number of print jobs with the same order ID, and the number of print jobs with the status of "done" in the sorting process 205, and the fifth communication unit 47 transmits the screen information of the sort information screen 130 to the input and output device 80*e*. In the case the number of print jobs with the same order ID (an example of the number of products) and the number of sorted print jobs are different, the sort information screen 130 is displayed, and in the case the number of print jobs with the same order ID matches the number of sorted print jobs, a sort information screen 130 and a pop-up message are displayed. The sort information screen 130 and the pop-up message may be displayed simultaneously, or the pop-up message may be displayed following the sort information screen 130.

S29: The sixth communication unit 81 of the input and output device 80*e* receives the screen information of the sort information screen, and the display control unit 82 displays the sort information screen 130.

S30: In response to reading the barcode label of any apparel product in the basket by the operator using the input and output device 80*f* of the packing process 206, the code reading unit 84 decodes the order ID and the job ID.

S31: The sixth communication unit 81 transmits the order ID and job ID to the information processing system 40.

S32: The fifth communication unit 47 of the information processing system 40 receives the order ID and job ID, and the workflow management unit 44 acquires the current status from the management information storage unit 4003 based on the order ID and job ID. In response to receiving the order ID and the job ID after the sorting process 205 is completed, the workflow management unit 44 determines to display the information on the packing process 206. The screen generation unit 48 refers to the display information management table of FIG. 13 to identify information to be displayed in the packing process 206. The workflow management unit 44 acquires all conceptual drawings with the same order ID from the order information. The screen generation unit 48 generates a screen using the conceptual drawing, and the fifth communication unit 47 transmits the screen information of the packing information screen 140 to the input and output device 80*f*. In the case no bundled product is registered, or in the case the order ID and job ID are received for all print jobs with the same order ID, step S35 is executed.

S33: The sixth communication unit 81 of the input and output device 80*f* receives the screen information of the packing information screen, and the display control unit 82 displays the packing information screen 140. In response to the reading of the barcode labels of the remaining apparel products in the basket, the code reading unit 84 decodes the order ID and job ID.

S34: The sixth communication unit 81 transmits the order ID and job ID to the information processing system 40.

S35: The fifth communication unit 47 of the information processing system 40 receives the order ID and job ID, and the workflow management unit 44 determines whether the order ID and job ID are received for all print jobs with the same order ID. Based on determination that the order IDs and job IDs are received for all print jobs with the same order ID, the workflow management unit 44 updates the status of the packing process 206 to "done" for all print jobs with the same order ID in the management information storage unit 4003. The fifth communication unit 47 transmits a pop-up message stating that packing is completed to the input and output device 80*f*. Further, in response to a request from the information processing system 40, the print execution unit 86 prints the invoice, the delivery label, and the like with the label printer 73.

In case a job ID associated with an order ID different from the order ID read in step S32 is sent from the input and output device 80*f*, the apparel products of different orders are mixed in one basket. In response to a detection of a situation as described above by the workflow management unit 44, the screen generation unit 48 includes in the pop-up message an error message stating that the apparel products of different orders are included in one basket.

S36: The sixth communication unit 81 of the input and output device 80*f* receives the pop-up message, and the display control unit 82 displays the pop-up message on the packing information screen 140.

As described above, the operator is able to proceed the process by reading the bar code label in the instructed steps, and does not have to memorize the order of the steps.

In FIGS. 20A and 20B, the order ID and the job ID are transmitted from the input and output device 80 to the information processing system 40 by reading the bar code label. In addition, the process that the input and output device 80 is assigned to may be transmitted to the information processing system 40 together with the order ID and the job ID. The information processing system 40 is able to determine whether the bar code label is read on the correct input and output device 80 for the process.

A determination method of selecting the DTG printer 72 in response to the job transmission unit 50 inputting a print job to the input and output device 80c in the printing process 203, and a determination method of determining a change of the platen is described in the following. In the case a plurality of DTG printers 72 are connected to one input and output device 80c, the job transmission unit 50 designates the DTG printer 72 and transmits the print job to the input and output device 80c. In the case a plurality of sets of the input and output device 80c and the DTG printer 72 are registered in the job transmission unit 50 in advance, the job transmission unit 50 identifies a set of the input and output device 80c and the DTG printer 72 to transmit the print job.

FIG. 21 is a flowchart illustrating a process in which the determination unit 53 determines the DTG printer 72 to assign the print job and whether to change the platen.

S101: The workflow management unit 44 registers the print job in the job management information storage unit 4006 by reading the barcode label in the printing process 203. At this point, the DTG printer 72 to be used by the print job is not decided.

The DTG printer 72 to be used for the print job registered in the job management information storage unit 4006 is determined in consideration of production efficiency as follows.

S102: The determination unit 53 refers to the printer management information storage unit 4005 and determines whether there is a DTG printer 72 on standby. The print job is not executed until the DTG printer 72 on standby is found.

S103: When the DTG printer 72 on standby is found, the determination unit 53 determines the work content of a waiting print job. Details are described below with reference to FIG. 22.

Based on determination to change the platen in step S103, the determination unit 53 determines to instruct the operator to change the platen. S104: The screen generation unit 48 generates a platen change message 109 displaying the platen before change and the platen after change, and the fifth communication unit 47 transmits the platen change message 109 to the input and output device 80c.

S105: The operator confirms the platen change message 109 and changes the platen attached to the DTG printer 72.

S106: The monitoring unit 87 detects the change of the platen, and the sixth communication unit 81 transmits the identification information of the DTG printer 72 and the identification information of the platen to the information processing system 40.

S107: The fifth communication unit 47 of the information processing system 40 receives the identification information of the DTG printer 72 and the identification information of the platen, and the acquisition unit 52 updates the attached platen (set platen) of the printer management information.

Based on determination to print in step S103, or in the case the platen is changed (as described in FIG. 22, the platen to be used for the print job is attached to the DTG printer 72 on standby), the determination unit 53 determines to instruct the operator to print. S108: The screen generation unit 48 generates a print information screen displaying the DTG printer 72 to be used for the printing and the print job, and the fifth communication unit 47 transmits the screen information of the print information screen to the input and output device 80c. The job transmission unit 50 transmits the print job to the input and output device 80c connected to the DTG printer 72 to which the print job is assigned.

S109: The operator confirms the print information screen and presses the start key of the DTG printer 72.

S110: The monitoring unit 87 detects the start of operation of the DTG printer 72, and the sixth communication unit 81 transmits the identification information of the DTG printer 72 and the start of operation to the information processing system 40.

S111: The fifth communication unit 47 of the information processing system 40 receives the identification information and start of operation of the DTG printer 72, the acquisition unit 52 updates the operation status of the printer management information to the operating status, and registers the start of the print job in the job management information storage unit 4006.

S114: The determination unit 53 performs the same processing for the next print job in the job management information storage unit 4006.

S112: In response to a detection by the monitoring unit 87 of a completion of printing by the DTG printer 72, the sixth communication unit 81 transmits the identification information of the DTG printer 72 and the completion of printing to the information processing system 40.

S113: The fifth communication unit 47 of the information processing system 40 receives the identification information of the DTG printer 72 and the completion of printing, the acquisition unit 52 updates the operating status of the printer management information to idle, and the operating status "idle" of the printer management information is registered in the job management information storage unit 4006.

The information processing system 40 repeats the process until all print jobs in the job management information are completed, and continues to determine the work content of the next print job from the unfinished print job, the operation status of the DTG printer 72, and the attached platen.

FIG. 22 is a flowchart illustrating an example of a process for determining work content of the waiting print job.

S201: The determination unit 53 determines whether there is a DTG printer 72 attached with the platen to be used in a newly registered print job among the DTG printers 72 on standby. Accordingly, the newly generated print job can be printed by the DTG printer 72 on standby with the platen to be used attached. The platen to be used in a print job is stored in the job management information.

S202: Based on determination "YES" in step S201, the determination unit 53 assigns the print job to the DTG printer 72 attached with the platen to be used in the newly registered print job among the DTG printers 72 on standby.

S203: Based on determination "NO" in step S201, the determination unit 53 determines whether there is a print job that can be printed by the platen attached to the DTG printer 72 on standby. Whether there is a print job that can be printed by the DTG printer 72 on standby can be determined from the job management information storage unit 4006. The number of platen changes can be reduced by the determination unit 53 preferentially selecting a print job printable by the platen that is already attached. In step S202, older print jobs are preferentially selected.

S204: Based on determination "YES" in step S203, the determination unit 53 determines to allocate the "print job printable by the platen attached to the DTG printer 72 on standby" to the DTG printer 72 on standby.

S205: Based on determination "NO" in step S203, the determination unit 53 determines whether all platens with the highest frequency of use among the platens for the waiting print jobs are installed.

Whether the platen is to be changed can be determined in this step. The determination unit 53 counts the platens used in the print jobs that are not started in the job management information, and determines the platen with the highest count as the platen with the highest usage frequency. Whether the most frequently used platens are all attached to other DTG printers 72 in the production base system is determined by comparing the number of platens registered in the platen management information storage unit 4004 and the number of platens registered in the printer management information storage unit 4005.

S206: In the case all of the most frequently used platens to be used for the waiting print job are attached to other DTG printers 72 in the production base system, the print job is skipped. In this case, the print job is forced to standby until the DTG printer 72 becomes idle. The content of the work is determined for the next print job without being registered in the item of start of the job management information.

S207: In the case all the platens with the highest frequency of use are not attached to the DTG printer 72, the determination unit 53 determines to instruct to change to the platen with the highest frequency of use. The platen before change (the platen to be removed) is the platen attached to the DTG printer 72 on standby.

As described above, the determination unit 53 can instruct the operator on the work content while considering the platen currently attached to the DTG printer 72 based on the job management information that constantly changes due to orders received or the like. By following the instructions of the information processing system 40, the operator can maintain a certain working efficiency.

In the case the print jobs using platens with high usage frequency continue to be received, print jobs using platens with low usage frequency may not be printed with the processes illustrated in FIGS. 21 and 22. In an actual production process, there are cases where priority of the print job using a platen that is used less frequently is to be raised due to production deadlines.

Figures 23, 24A, 24B:
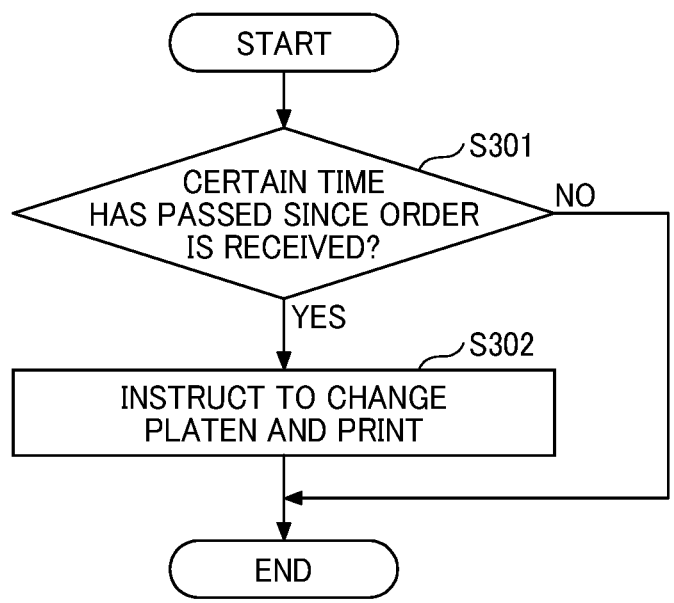
FIG. 23 is a flowchart illustrating an example of a process for executing the print job using a platen with a low usage frequency.
FIGS. 24A and 24B are tables illustrating display examples of job management information and printer management information displayed by an administrator on an input and output device.

FIG. 23 is a flowchart illustrating a process for executing a print job using a platen with a low usage frequency.

S301: The determination unit 53 determines whether a predetermined time or more has elapsed since the print job stored in the job management information storage unit 4006 was received. The predetermined period of time can be set by the administrator at each production site. The elapsed time may be measured from registration in the job management information. The order date and time is the order date and time of the order information.

S302: In the case there is a print job for which the predetermined period of time has elapsed since the order was received, the determination unit 53 determines that the platen should be changed to the platen to be used by this print job.

Accordingly, the print job using the platen with low frequency of use is printed within a certain period of time.

FIGS. 24A and 24B are tables illustrating display examples of job management information and printer management information displayed by the administrator on the input and output device 80. Part of the job management information is displayed in FIG. 24A, and printer management information is displayed in FIG. 24B. The administrator displays the information for the administrator as illustrated in FIGS. 24A and 24B by logging in from the input and output device 80 with administrator authority. The administrator is able to check the progress of each print job and the operating status of the DTG printer 72.

As described above, according to the information processing system 40 of the present embodiment, in addition to the operation status of the DTG printer 72, the platen is changed based on the platen to be used by the print job, the production is carried out in an efficient work order regardless of skill level of the operator. Also, the number of times the operator changes the platen is reduced.

Although the best mode for carrying out the present disclosure has been described using the examples described above, the present disclosure is not limited to these examples, and various modifications and substitutions can be made without departing from the scope of the present disclosure.

For example, in the present embodiment, the production of apparel products is described, but the present disclosure can be applied to products completed by printing images on materials on demand.

In the system configuration illustrated in FIG. 2 and the like, although the DTG printer 72 is connected to the input and output device 80c, the DTG printer 72 may be connected to the information processing system 40 as well. The label printers 71 and 73 may also be connected to either information processing system 40 or input and output device 80. Further, the label printers 71 and 73 and the DTG printer 72 may be connected to the network.

Further, the configuration example of FIG. 5 and the like is divided according to main functions in order to facilitate understanding of processing by the order reception system 10, the information processing system 40, and the production base system 30. The present disclosure is not limited by the method and name of division of processing units. The processing of the order reception system 10, the information processing system 40, and the production base system 30 may be divided into more processing units according to the content of the processing. Further, one process may be divided to include a larger number of processes.

The apparatuses or devices described in one or more embodiments are just one example of plural computing environments that implement the one or more embodiments disclosed herein. In some embodiments, information processing system 40 includes multiple computing devices, such as a server cluster. The multiple computing devices are configured to communicate with one another through any type of communication link, including a network, shared memory, and the like, and perform the processes disclosed herein.

Aspects of the present disclosure are, for example, as follows.

According to a first aspect, a program to cause an information processing system for controlling production of an ordered product by printing, to function as an acquisition unit for acquiring correspondence information associating a jig attached to an image forming apparatus and the image forming apparatus, a determination unit for determining the jig to be attached to the image forming apparatus on standby based on the correspondence information and the jig to be used in the printing, and an output unit for outputting a change of the jig to the jig determined by the determination unit.

According to a second aspect, in the program of the first aspect, the jig to be used for each print job is registered in job management information in which a plurality of print jobs related to the product are registered, and the determination unit determines the jig having the highest frequency of use in the job management information as the jig to be attached to the image forming apparatus.

According to a third aspect, in the program of the first aspect or the second aspect, in the case the jig to be used for a newly generated print job is attached to the image forming apparatus according to the correspondence information, the determination unit determines to print with the image forming apparatus to which the jig is attached, and the output unit outputs that printing is to be performed by the image forming apparatus determined by the determination unit.

According to a fourth aspect, in the program of the second aspect, in a case the jig to be used by the print job registered in the job management information is already attached to the image forming apparatus, the determination unit determines to print with the image forming apparatus to which the jig is attached, the output unit outputs that the printing is to be performed by the image forming apparatus determined by the determination unit.

According to a fifth aspect, the program of the third aspect or the fourth aspect, causes to function as a job transmission unit for transmitting the print job to be printed by using the jig attached to the image forming apparatus to an input and output device connected to the image forming apparatus determined by the determination unit.

According to a sixth aspect, in the program of the fourth aspect, the determination unit determines whether the jig to be used by the print job is already attached to the image forming apparatus, among the print jobs registered in the job management information, with priority on the print job with the oldest elapsed time from the order.

According to a seventh aspect, in the program of the second aspect, in a case the jig with the highest frequency of use in the job management information is already attached to the image forming apparatus in operation, the determination unit determines to put the print job that uses the jig with the highest usage frequency on hold.

According to an eighth aspect, in the program of the second aspect, in a case the jig to be used for the print job for which elapsed time from the order is over a certain period of time is not the jig with the highest frequency of use according to the job management information, the determination unit determines that the jig to be used by the print job as the jig to be attached to the image forming apparatus.

According to a ninth aspect, in the program of any one of the first aspect to the seventh aspect, the information processing system is capable of communicating with an input and output device, and in response to receiving from the input and output device, the identification information of the order attached to the product read by the input and output device, the output unit outputs to the input and output device a change of the jig.

According to a tenth aspect, in the program of any one of the first aspect to the seventh aspect, the input and output device is connected to the image forming apparatus, and the acquisition unit updates the correspondence information in real time based on the jig attached to the image forming apparatus transmitted from the input and output device.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A jig determination method executed by an information processing system for controlling production of an ordered product by printing, the method comprising:
acquiring correspondence information associating, for each image forming apparatus, a jig attached to the image forming apparatus and the image forming apparatus;
determining a jig to be attached to an image forming apparatus on standby based on the correspondence information and a jig to be used in printing of the ordered product;
outputting information indicating a change of the jig attached to the image forming apparatus on standby based on a result of the determining; and
registering, in job management information, a plurality of print jobs related to the ordered product and a jig to be used for each print job, wherein
the determining the jig to be attached to the image forming apparatus on standby includes determining the jig having the highest frequency of use in the job management information as the jig to be attached to the image forming apparatus;
wherein in a case the jig having the highest frequency of use in the job management information is already attached to the image forming apparatus in operation, the method further comprises suspending the print job that uses the jig with the highest frequency of use.

2. The jig determination method of claim 1, wherein
in a case the correspondence information indicates that the jig to be used for a newly generated print job is attached to the image forming apparatus,
the method further comprises:
determining to print with the image forming apparatus to which the jig to be used for the newly generated print job is attached; and
outputting an indication that printing is to be performed by the image forming apparatus to which the jig is attached.

3. The jig determination method of claim 1, wherein
in a case the jig to be used by the print job registered in the job management information is already attached to the image forming apparatus,
the method further comprises:
determining to print with the image forming apparatus to which the jig is attached; and
outputting an indication that the printing is to be performed by the image forming apparatus to which the jig is attached.

4. The jig determination method of claim 2, further comprising
transmitting the print job to be performed to execute printing by using the jig attached to the image forming apparatus to an input and output device connected to the image forming apparatus to which the jig is attached.

5. The jig determination method of claim 3, further comprising
determining whether the jig to be used by the print job is already attached to the image forming apparatus, with priority on the print job having the longest elapsed time from a time when an order was made, from among the plurality of print jobs registered in the job management information.

6. The jig determination method of claim 1, wherein
in a case the jig to be used for the print job has an elapsed time from the time when an order was made that exceeds a certain period of time, the method includes determining the jig to be used by the print job as the jig to be attached to the image forming apparatus, irrespective of whether the jig is the jig having the highest frequency of use according to the job management information.

7. The jig determination method of claim 1, wherein
the method further comprises:
with the information processing system capable of communicating with an input and output device, receiving from the input and output device identification information of an order attached to the ordered product read by the input and output device,
the outputting information includes outputting to the input and output device the information indicating a change of the jig.

8. The jig determination method of claim 7, further comprising
with the input and output device connected to the image forming apparatus, updating the correspondence information in real time based on the information on the jig attached to the image forming apparatus transmitted from the input and output device.

9. A production base system comprising:
an information processing system configured to produce an ordered product by printing; and
one or more input and output devices,
the information processing system including circuitry configured to:
acquire correspondence information associating, for each image forming apparatus, a jig attached to the image forming apparatus and the image forming apparatus;
determine a jig to be attached to an image forming apparatus on standby based on the correspondence information and a jig to be used in printing of the ordered product;
transmit, to at least one of the one or more input and output devices, information indicating a change of the jig attached to the image forming apparatus on standby, and
the at least one input and output device including circuitry configured to output the information indicating the change of the jig received from the information processing system;
wherein the circuitry is further configured to:
register, in job management information, a plurality of print jobs related to the ordered product and a jig to be used for each print job; and
in determining the jig to be attached, determine the jig having the highest frequency of use in the job management information as the jig to be attached to the image forming apparatus;
wherein in a case the jig having the highest frequency of use in the job management information is already attached to the image forming apparatus in operation, the circuitry is further configured to suspend the print job that uses the jig with the highest frequency of use.

10. An information processing system for controlling production of an ordered product by printing, the information processing system comprising circuitry configured to:
acquire correspondence information associating, for each image forming apparatus, a jig attached to the image forming apparatus and the image forming apparatus;
determine a jig to be attached to an image forming apparatus on standby based on the correspondence information and a jig to be used in printing of an ordered product; and
output information indicating a change of the jig attached to the image forming apparatus on standby;
wherein the circuitry is further configured to:
register, in job management information, a plurality of print jobs related to the ordered product and a jig to be used for each print job; and
in the determining the jig to be attached, determine the jig having the highest frequency of use in the job management information as the jig to be attached to the image forming apparatus;
wherein in a case the jig having the highest frequency of use in the job management information is already attached to the image forming apparatus in operation, the circuitry is further configured to suspend the print job that uses the jig with the highest frequency of use.

11. The information processing system of claim 10, wherein
in a case the correspondence information indicates that the jig to be used for a newly generated print job is attached to the image forming apparatus, the circuitry is further configured to:
determine to print with the image forming apparatus to which the jig to be used for the newly generated print job is attached; and
output an indication that printing is to be performed by the image forming apparatus to which the jig is attached.

12. The information processing system of claim 10, wherein
in a case the jig to be used by the print job registered in the job management information is already attached to the image forming apparatus,
the circuitry is further configured to:
determine to print with the image forming apparatus to which the jig is attached; and
output an indication that the printing is to be performed by the image forming apparatus to which the jig is attached.

13. The information processing system of claim 11, wherein
the circuitry is further configured to transmit the print job to be performed to execute printing by using the jig attached to the image forming apparatus to an input and output device connected to the image forming apparatus to which the jig is attached.

14. The information processing system of claim 12, wherein
the circuitry is further configured to determine whether the jig to be used by the print job is already attached to the image forming apparatus, with priority on the print job having the longest elapsed time from a time when an order was made, from among the plurality of print jobs registered in the job management information.

15. The information processing system of claim 10, wherein
in a case the jig to be used for the print job has an elapsed time from the time when an order was made that exceeds a certain period of time, the circuitry is configured to determine the jig to be used by the print job as the jig to be attached to the image forming apparatus, irrespective of whether the jig is the jig having the highest frequency of use according to the job management information.

16. The information processing system of claim 10 wherein
the circuitry is further configured to:
receive from an input and output device identification information of an order attached to the ordered product read by the input and output device, and
in the outputting information, output to the input and output device the information indicating a change of the jig.

* * * * *